United States Patent
Campbell et al.

(10) Patent No.: US 9,904,811 B2
(45) Date of Patent: Feb. 27, 2018

(54) TAMPER-PROOF ELECTRONIC PACKAGES WITH TWO-PHASE DIELECTRIC FLUID

(71) Applicant: INTERNATIONAL BUSINESS MACHINES CORPORATION, Armonk, NY (US)

(72) Inventors: Levi A. Campbell, Poughkeepsie, NY (US); Milnes P. David, Fishkill, NY (US); Dustin W. Demetriou, Poughkeepsie, NY (US); Michael J. Ellsworth, Jr., Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/139,503

(22) Filed: Apr. 27, 2016

(65) Prior Publication Data
US 2017/0316228 A1   Nov. 2, 2017

(51) Int. Cl.
*H05K 1/00*  (2006.01)
*G06F 21/86*  (2013.01)
(Continued)

(52) U.S. Cl.
CPC ........... *G06F 21/86* (2013.01); *G06F 21/62* (2013.01); *H05K 1/0275* (2013.01);
(Continued)

(58) Field of Classification Search
CPC ....... G06F 21/86; G06F 21/62; H05K 1/0275; H05K 1/182; H05K 5/067; H05K 5/069
(Continued)

(56) References Cited

U.S. PATENT DOCUMENTS

| | | |
|---|---|---|
| 3,165,569 A | 1/1965 | Bright et al. |
| 4,160,503 A | 7/1979 | Ohlbach |
| | (Continued) | |

FOREIGN PATENT DOCUMENTS

| | | |
|---|---|---|
| CN | 2014-30639 Y | 3/2010 |
| CN | 10-4346587 A | 2/2015 |
| | (Continued) | |

OTHER PUBLICATIONS

Dragone et al., "Tamper-Respondent Assembly with Sensor Connection Adapter", U.S. Appl. No. 15/268,959, filed Sep. 19, 2016 (45 pages).
(Continued)

*Primary Examiner* — Dion R Ferguson
*Assistant Examiner* — Mandeep S Buttar
(74) *Attorney, Agent, or Firm* — Steven S. Chiu, Esq.; Kevin P. Radigan, Esq.; Heslin, Rothenberg, Farley & Mesiti, P.C.

(57) ABSTRACT

Tamper-proof electronic packages and fabrication methods are provided including an enclosure enclosing, at least in part, at least one electronic component within a secure volume, a two-phase dielectric fluid within the secure volume, and a tamper-respondent detector. The tamper-respondent detector monitors, at least in part, temperature and pressure of the two-phase dielectric fluid. In operation, the two-phase dielectric fluid deviates from an established saturation line of the two-phase dielectric fluid within the secure volume with an intrusion event into the secure volume, and the tamper-respondent detector detects, from the monitoring of the temperature and pressure of the two-phase dielectric fluid, the deviation from the established saturation line, and thereby occurrence of the intrusion event.

20 Claims, 15 Drawing Sheets

(51) Int. Cl.
*H05K 5/06* (2006.01)
*H05K 1/02* (2006.01)
*H05K 7/20* (2006.01)
*H05K 1/18* (2006.01)
*G06F 21/62* (2013.01)

(52) U.S. Cl.
CPC ........... *H05K 1/0298* (2013.01); *H05K 1/182* (2013.01); *H05K 5/067* (2013.01); *H05K 5/069* (2013.01); *H05K 7/20318* (2013.01); *H05K 2201/10151* (2013.01)

(58) Field of Classification Search
USPC .......................................... 361/700; 713/194
See application file for complete search history.

(56) References Cited

U.S. PATENT DOCUMENTS

| | | | |
|---|---|---|---|
| 4,211,324 A | 7/1980 | Ohlbach | |
| 4,324,823 A | 4/1982 | Ray, III | |
| 4,516,679 A | 5/1985 | Simpson | |
| 4,496,900 A | 6/1985 | Di Stefano et al. | |
| 4,593,384 A | 6/1986 | Kleinjne | |
| 4,609,104 A | 9/1986 | Kasper et al. | |
| 4,653,252 A | 3/1987 | Van de Haar et al. | |
| 4,677,809 A | 7/1987 | Long et al. | |
| 4,691,350 A | 9/1987 | Kleijne et al. | |
| 4,807,284 A | 2/1989 | Kleijne | |
| 4,811,288 A | 3/1989 | Kleijne et al. | |
| 4,860,351 A | 8/1989 | Weingart | |
| 4,865,197 A | 9/1989 | Craig | |
| 5,009,311 A | 4/1991 | Schenk | |
| 5,027,397 A | 6/1991 | Double et al. | |
| 5,060,114 A | 10/1991 | Feinberg et al. | |
| 5,075,822 A | 12/1991 | Baumler et al. | |
| 5,117,457 A | 5/1992 | Comerford et al. | |
| 5,159,629 A | 10/1992 | Double et al. | |
| 5,185,717 A | 2/1993 | Mori | |
| 5,201,868 A | 4/1993 | Johnson | |
| 5,201,879 A | 4/1993 | Steele et al. | |
| 5,211,618 A | 5/1993 | Stoltz | |
| 5,239,664 A | 8/1993 | Verrier et al. | |
| 5,389,738 A | 2/1995 | Piosenka et al. | |
| 5,406,630 A | 4/1995 | Piosenka et al. | |
| 5,506,566 A | 4/1996 | Oldfield et al. | |
| 5,568,124 A | 10/1996 | Joyce et al. | |
| 5,594,439 A | 1/1997 | Swanson | |
| 5,675,319 A | 10/1997 | Rivenberg et al. | |
| 5,715,652 A | 2/1998 | Stahlecker | |
| 5,761,054 A | 6/1998 | Kuhn | |
| 5,813,113 A | 9/1998 | Stewart et al. | |
| 5,858,500 A | 1/1999 | MacPherson | |
| 5,880,523 A | 3/1999 | Candelore | |
| 5,988,510 A | 11/1999 | Tuttle et al. | |
| 6,121,544 A | 9/2000 | Petsinger | |
| 6,195,267 B1 | 2/2001 | MacDonald, Jr. et al. | |
| 6,201,296 B1 | 3/2001 | Fries et al. | |
| 6,233,339 B1* | 5/2001 | Kawano ................. G06F 21/87 380/44 | |
| 6,261,215 B1 | 7/2001 | Imer | |
| 6,301,096 B1 | 10/2001 | Wozniczka | |
| 6,384,397 B1 | 5/2002 | Takiar et al. | |
| 6,424,954 B1 | 7/2002 | Leon | |
| 6,438,825 B1 | 8/2002 | Kuhm | |
| 6,469,625 B1 | 10/2002 | Tomooka | |
| 6,473,995 B2 | 11/2002 | Miyakawa et al. | |
| 6,512,454 B2 | 1/2003 | Miglioli et al. | |
| 6,686,539 B2 | 2/2004 | Farquhar et al. | |
| 6,746,960 B2 | 6/2004 | Goodman et al. | |
| 6,798,660 B2 | 9/2004 | Moss et al. | |
| 6,817,204 B2* | 11/2004 | Bash ................. G06F 1/20 165/104.33 | |
| 6,853,093 B2 | 2/2005 | Cohen et al. | |
| 6,879,032 B2 | 4/2005 | Rosenau et al. | |
| 6,929,900 B2 | 8/2005 | Farquhar et al. | |
| 6,946,960 B2* | 9/2005 | Sisson ................. G08B 13/149 340/540 | |
| 6,957,345 B2 | 10/2005 | Cesana et al. | |
| 6,970,360 B2 | 11/2005 | Sinha | |
| 6,985,362 B2 | 1/2006 | Mori et al. | |
| 6,991,961 B2 | 1/2006 | Hubbard et al. | |
| 6,996,953 B2 | 2/2006 | Perreault et al. | |
| 7,005,733 B2 | 2/2006 | Kommerling et al. | |
| 7,015,823 B1 | 5/2006 | Gillen et al. | |
| 7,054,162 B2 | 5/2006 | Benson et al. | |
| 7,057,896 B2 | 6/2006 | Matsuo et al. | |
| 7,094,143 B2 | 8/2006 | Wolm et al. | |
| 7,094,459 B2 | 8/2006 | Takahashi | |
| 7,095,615 B2 | 8/2006 | Nichols | |
| 7,156,233 B2 | 1/2007 | Clark et al. | |
| 7,180,008 B2 | 2/2007 | Heitmann et al. | |
| 7,189,360 B1 | 3/2007 | Ho et al. | |
| 7,214,874 B2 | 5/2007 | Dangler et al. | |
| 7,247,791 B2 | 7/2007 | Kulpa | |
| 7,304,373 B2 | 12/2007 | Taggart et al. | |
| 7,310,737 B2 | 12/2007 | Patel et al. | |
| 7,465,887 B2 | 12/2008 | Suzuki et al. | |
| 7,475,474 B2 | 1/2009 | Heitmann et al. | |
| 7,515,418 B2 | 4/2009 | Straznicky et al. | |
| 7,549,064 B2 | 6/2009 | Elbert et al. | |
| 7,640,658 B1 | 1/2010 | Pham et al. | |
| 7,643,290 B1 | 1/2010 | Narasimhan et al. | |
| 7,663,883 B2 | 2/2010 | Shirakami et al. | |
| 7,672,129 B1 | 3/2010 | Ouyang et al. | |
| 7,731,517 B2 | 6/2010 | Lee et al. | |
| 7,746,657 B2 | 6/2010 | Oprea et al. | |
| 7,760,086 B2 | 7/2010 | Hunter et al. | |
| 7,768,005 B2 | 8/2010 | Condorelli et al. | |
| 7,783,994 B2 | 8/2010 | Ball et al. | |
| 7,787,256 B2* | 8/2010 | Chan ................. G06F 21/87 174/250 | |
| 7,868,411 B2 | 1/2011 | Eaton et al. | |
| 7,898,413 B2 | 3/2011 | Hsu et al. | |
| 7,901,977 B1 | 3/2011 | Angelopoulos et al. | |
| 7,947,911 B1 | 5/2011 | Pham et al. | |
| 7,978,070 B2 | 7/2011 | Hunter | |
| 8,084,855 B2 | 12/2011 | Lower et al. | |
| 8,094,450 B2 | 1/2012 | Cole et al. | |
| 8,101,267 B2 | 1/2012 | Samuels et al. | |
| 8,133,621 B2 | 3/2012 | Wormald et al. | |
| 8,199,506 B2 | 6/2012 | Janik et al. | |
| 8,287,336 B2 | 10/2012 | Dangler et al. | |
| 8,325,486 B2 | 12/2012 | Arshad et al. | |
| 8,345,423 B2* | 1/2013 | Campbell ........... F28D 15/0233 165/104.33 | |
| 8,516,269 B1 | 8/2013 | Hamlet et al. | |
| 8,589,703 B2 | 11/2013 | Lee et al. | |
| 8,646,108 B2 | 2/2014 | Shiakallis et al. | |
| 8,659,506 B2 | 2/2014 | Nomizo | |
| 8,659,908 B2 | 2/2014 | Adams et al. | |
| 8,664,047 B2 | 3/2014 | Lower et al. | |
| 8,716,606 B2 | 5/2014 | Kelley et al. | |
| 8,797,059 B2 | 8/2014 | Boday et al. | |
| 8,836,509 B2 | 9/2014 | Lowy | |
| 8,853,839 B2 | 10/2014 | Gao et al. | |
| 8,879,266 B2 | 11/2014 | Jarvis et al. | |
| 8,890,298 B2 | 11/2014 | Buer et al. | |
| 8,947,889 B2 | 2/2015 | Kelley et al. | |
| 8,961,280 B2 | 2/2015 | Dangler et al. | |
| 9,003,199 B2 | 4/2015 | Dellmo et al. | |
| 9,011,762 B2 | 4/2015 | Seppa et al. | |
| 9,052,070 B2 | 6/2015 | Davis et al. | |
| 9,166,586 B2 | 10/2015 | Carapelli et al. | |
| 9,298,956 B2 | 3/2016 | Wade et al. | |
| 2001/0050425 A1 | 12/2001 | Beroz et al. | |
| 2001/0056542 A1 | 12/2001 | Cesana et al. | |
| 2002/0002683 A1* | 1/2002 | Benson ................. G06F 21/86 713/194 | |
| 2002/0068384 A1 | 6/2002 | Beroz et al. | |
| 2002/0084090 A1 | 7/2002 | Farquhar | |
| 2003/0009684 A1 | 1/2003 | Schwenck et al. | |
| 2005/0068735 A1 | 3/2005 | Fissore et al. | |
| 2005/0111194 A1 | 5/2005 | Sohn et al. | |

(56) References Cited

U.S. PATENT DOCUMENTS

| | | |
|---|---|---|
| 2005/0180104 A1 | 8/2005 | Olesen et al. |
| 2006/0034731 A1 | 2/2006 | Lewis et al. |
| 2006/0072288 A1 | 4/2006 | Stewart et al. |
| 2006/0196945 A1 | 9/2006 | Mendels |
| 2006/0218779 A1 | 10/2006 | Ooba et al. |
| 2007/0064396 A1 | 3/2007 | Oman et al. |
| 2007/0064399 A1 | 3/2007 | Mandel et al. |
| 2007/0108619 A1 | 5/2007 | Hsu |
| 2007/0211436 A1 | 9/2007 | Robinson et al. |
| 2007/0230127 A1 | 10/2007 | Peugh et al. |
| 2007/0268671 A1 | 11/2007 | Brandenburg et al. |
| 2008/0050512 A1 | 2/2008 | Lower et al. |
| 2008/0144290 A1 | 6/2008 | Brandt et al. |
| 2008/0159539 A1 | 7/2008 | Huang et al. |
| 2008/0160274 A1 | 7/2008 | Dang et al. |
| 2008/0191174 A1 | 8/2008 | Ehrensvard et al. |
| 2008/0251906 A1 | 10/2008 | Eaton et al. |
| 2009/0073659 A1 | 3/2009 | Peng et al. |
| 2009/0166065 A1 | 7/2009 | Clayton et al. |
| 2010/0088528 A1 | 4/2010 | Sion |
| 2010/0110647 A1 | 5/2010 | Hiew et al. |
| 2010/0134959 A1* | 6/2010 | Fife ............ H05K 7/20945 361/678 |
| 2010/0177487 A1 | 7/2010 | Arshad et al. |
| 2010/0319986 A1 | 12/2010 | Bleau et al. |
| 2011/0001237 A1 | 1/2011 | Brun et al. |
| 2011/0038123 A1 | 2/2011 | Janik et al. |
| 2011/0103027 A1 | 5/2011 | Aoki et al. |
| 2011/0241446 A1 | 10/2011 | Tucholski |
| 2011/0299244 A1 | 12/2011 | Dede et al. |
| 2012/0050998 A1 | 3/2012 | Klum et al. |
| 2012/0117666 A1 | 5/2012 | Oggioni et al. |
| 2012/0140421 A1 | 6/2012 | Kirstine et al. |
| 2012/0319986 A1 | 6/2012 | Toh et al. |
| 2012/0185636 A1 | 7/2012 | Leon et al. |
| 2012/0244742 A1 | 9/2012 | Wertz et al. |
| 2012/0256305 A1 | 10/2012 | Kaufmann et al. |
| 2012/0320529 A1 | 12/2012 | Loong et al. |
| 2013/0033818 A1 | 2/2013 | Hosoda et al. |
| 2013/0104252 A1 | 4/2013 | Yanamadala et al. |
| 2013/0141137 A1 | 6/2013 | Krutzik et al. |
| 2013/0158936 A1 | 6/2013 | Rich et al. |
| 2013/0170217 A1 | 7/2013 | Lee |
| 2013/0208422 A1 | 8/2013 | Hughes et al. |
| 2013/0235527 A1 | 9/2013 | Wagner et al. |
| 2013/0283386 A1 | 10/2013 | Lee |
| 2014/0022733 A1 | 1/2014 | Lim et al. |
| 2014/0160679 A1 | 6/2014 | Kelty et al. |
| 2014/0184263 A1 | 7/2014 | Ehrenpfordt et al. |
| 2014/0204533 A1 | 7/2014 | Abeyasekera et al. |
| 2014/0321064 A1 | 10/2014 | Bose et al. |
| 2014/0325688 A1 | 10/2014 | Cashin et al. |
| 2015/0007427 A1 | 1/2015 | Dangler et al. |
| 2015/0235053 A1 | 8/2015 | Lee et al. |
| 2016/0005262 A1 | 1/2016 | Hirato et al. |
| 2016/0137548 A1 | 5/2016 | Cabral, Jr. et al. |
| 2016/0262253 A1 | 9/2016 | Isaacs et al. |
| 2016/0262270 A1 | 9/2016 | Isaacs et al. |

FOREIGN PATENT DOCUMENTS

| | | |
|---|---|---|
| DE | 19816571 A1 | 10/1999 |
| DE | 19816572 A1 | 10/1999 |
| DE | 10-2012-203955 A1 | 9/2013 |
| EP | 0 056 360 A1 | 10/1993 |
| EP | 0 629 497 A2 | 12/1994 |
| EP | 1 184 773 A1 | 3/2002 |
| EP | 1 207 444 A2 | 5/2002 |
| EP | 1 734 578 A1 | 12/2006 |
| EP | 1 968 362 A2 | 9/2008 |
| EP | 2 104 407 A1 | 9/2009 |
| EP | 1 672 464 B1 | 4/2012 |
| EP | 2 560 467 A1 | 2/2013 |
| JP | 61-297035 A | 12/1986 |
| JP | 2000-238141 A | 9/2000 |
| JP | 2013-125807 A | 6/2013 |
| JP | 2013-140112 A | 7/2013 |
| WO | WO 1999/003675 A1 | 1/1999 |
| WO | WO 1999/021142 A1 | 4/1999 |
| WO | WO 2001/063994 A2 | 8/2001 |
| WO | WO 2003/012606 A2 | 2/2003 |
| WO | WO 2003/025080 A1 | 3/2003 |
| WO | WO 2004/040505 A1 | 5/2004 |
| WO | WO 2009/042335 A1 | 4/2009 |
| WO | WO 2009/092472 A1 | 7/2009 |
| WO | WO 2010/128939 A1 | 11/2010 |
| WO | WO 2013/004292 A1 | 1/2013 |
| WO | WO 2013/0189483 A1 | 12/2013 |
| WO | WO 2014/086987 A2 | 6/2014 |
| WO | WO 2014/158159 A1 | 10/2014 |

OTHER PUBLICATIONS

Dragone et al., "Vented Tamper-Respondent Assemblies", U.S. Appl. No. 15/275,748, filed Sep. 26, 2016 (53 pages).

Dragone et al., "Tamper-Respondent Assemblies with In Situ Vent Structure(s)", U.S. Appl. No. 15/275,762, filed Sep. 26, 2016 (72 pages).

Busby et al., "Tamper-Respondent Assemblies with Trace Regions of Increased Susceptibility to Breaking", U.S. Appl. No. 15/341,108, filed Nov. 2, 2016 (56 pages).

Brodsky et al., "Enclosure with Inner Tamper-Respondent Sensor(s)", U.S. Appl. No. 15/409,851, filed Jan. 19, 2017 (115 pages).

Brodsky et al., "Tamper-Respondent Assemblies with Enclosure-to-Board Protection", U.S. Appl. No. 15/423,833, filed Feb. 3, 2017 (54 pages).

Holm, Ragnar, "Electric Contacts: Theory and Application", Spinger-Verlag, New York, 4th Edition, 1981 (pp. 10-19).

Clark, Andrew J., "Physical Protection of Cryptographic Devices", Advanced in Cyprtology, Eurocrypt '87, Springer, Berlin Heidelberg (1987) (11 pages).

Halperin et al., "Latent Open Testing of Electronic Packaging", MCMC-194, IEEE (1994) (pp. 83-33).

Simek, Bob, "Tamper Restrictive Thermal Ventilation System for Enclosures Requiring Ventilation and Physical Security", IBM Publication No. IPCOM000008607D, Mar. 1, 1998 (2 pages).

Pamula et al., "Cooling of Integrated Circuits Using Droplet-Based Microfluidics", Association for Computing Machinery (ACM), GLSVLSI'03, Apr. 28-29, 2003 (pp. 84-87).

Saran et al., "Fabrication and Characterization of Thin Films of Single-Walled Carbon Nanotube Bundles on Flexible Plastic Substrates", Journal of the American Chemical Society, vol. 126, No. 14 (Mar. 23, 2004) (pp. 4462-4463).

Khanna P.K. et al., "Studies on Three-Dimensional Moulding, Bonding and Assembling of Low-Temperature-Cofired Ceramics MEMS and MST Applications." Materials Chemistry and Physics, vol. 89, No. 1 (2005) (pp. 72-79).

Drimer et al., "Thinking Inside the Box: System-Level Failures of Tamper Proofing", 2008 IEEE Symposium on Security and Privacy, (Feb. 2008) (pp. 281-295).

Loher et al., "Highly Integrated Flexible Electronic Circuits and Modules", 3rd International IEEE on Microsystems, Packaging, Assembly & Circuits Technology Conference (Oct. 22-24, 2008) (Abstract Only) (1 page).

Sample et al., "Design of an RFID-Based Battery-Free Programmable Sensing Platform", IEEE Transactions on Instrumentation and Measurement, vol. 57, No. 11, Nov. 2008 (pp. 2608-2615).

Jhang et al., "Nonlinear Ultrasonic Techniques for Non-Destructive Assessment of Micro Damage in Material: A Review", International Journal of Prec. Eng. & Manuf, vol. 10, No. 1, Jan. 2009 (pp. 123-135).

Anonymous, "Consolidated Non-Volatile Memory in a Chip Stack", IBM Technical Disclosure: IP.com No. IPCOM000185250, Jul. 16, 2009 (6 pages).

Isaacs et al., "Tamper Proof, Tamper Evident Encryption Technology", Pan Pacific Symposium SMTA Proceedings (2013) (9 pages).

(56) References Cited

OTHER PUBLICATIONS

Anonymous, "Selective Memory Encryption", IBM Technical Disclosure: IP.com IPCOM000244183, Nov. 20, 2015 (6 pages).
Zhou et al., "Nonlinear Analysis for Hardware Trojan Detection", ICSPCC2015, IEEE (2015) (4 pages).
Dangler et al., "Tamper-Respondent Sensors with Formed Flexible Layer(s)", U.S. Appl. No. 14/865,551, filed Sep. 25, 2015 (113 pages).
Brodsky et al., "Overlapping, Discrete Tamper-Respondent Sensors", U.S. Appl. No. 14/865,572, filed Sep. 25, 2015 (114 pages).
Dangler et al., "Tamper-Respondent Assemblies with Region(s) of Increased Susceptibility to Damage", U.S. Appl. No. 14/865,591, filed Sep. 25, 2015 (114 pages).
Brodsky et al., "Circuit Boards and Electronic Packages with Embedded Tamper-Respondent Sensor", U.S. Appl. No. 14/865,610, filed Sep. 25, 2015 (43 pages).
Brodsky et al, "Tamper-Respondent Assemblies", U.S. Appl. No. 14/865,632, filed Sep. 25, 2015 (115 pages).
Brodksky et al., "Enclosure with Inner Tamper-Respondent Sensor(s)", U.S. Appl. No. 14/865,651, filed Sep. 25, 2015 (115 pages).
Fisher et al., "Enclosure with Inner Tamper-Respondent Sensor(s) and Physical Security Element(s)", U.S. Appl. No. 14/865,686, filed Sep. 25, 2015 (114 pages).
Brodsky et al., "Tamper-Respondent Assemblies with Bond Protection", U.S. Appl. No. 14/865,708, filed Sep. 25, 2015 (113 pages).
Brodsky et al., "Circuit Layouts of Tamper-Respondent Sensors", U.S. Appl. No. 14/886,179, filed Oct. 19, 2015 (113 pages).
Isaacs, Phillip Duane, "Tamper-Respondent Assembly with Protective Wrap(s) Over Tamper-Respondent Sensor(s)", U.S. Appl. No. 14/918,691, filed Oct. 21, 2015 (40 pages).
Brodsky et al., "Tamper-Respondent Assemblies with Bond Protection", U.S. Appl. No. 14/941,860, filed Nov. 16, 2015 (108 pages).
Fisher et al., "Enclosure with Inner Tamper-Respondent Sensor(s) and Physical Security Element(s)", U.S. Appl. No. 14/941,872, filed Nov. 16, 2015 (109 pages).
Brodsky et al, "Tamper-Respondent Assemblies", U.S. Appl. No. 14/941,887, filed Nov. 16, 2015 (109 pages).
Brodsky et al., "Circuit Boards and Electronic Packages with Embedded Tamper-Respondent Sensors", U.S. Appl. No. 14/941,908, filed Nov. 16, 2015 (41 pages).
Fisher et al., "Tamper-Respondent Assembly with Vent Structure", U.S. Appl. No. 14/955,283, filed Dec. 1, 2015 (61 pages).
Fisher et al., "Applying Pressure to Adhesive Using CTE Mismatch Between Components", U.S. Appl. No. 14/963,681, filed Dec. 9, 2015 (68 pages).
Brodsky et al., "Tamper-Respondent Assemblies with Enclosure-to-Board Protection", U.S. Appl. No. 14/974,036, filed Dec. 18, 2015 (55 pages).
Busby et al., "Multi-Layer Stack with Embedded Tamper-Detect Protection", U.S. Appl. No. 15/053,336, filed Feb. 25, 2016 (68 pages).
Busby et al., "Tamper-Proof Electronic Packages Formed With Stressed Glass", U.S. Appl. No. 15/154,077, filed May 13, 2016 (45 pages).
Busby et al., "Tamper-Proof Electronic Packages With Stressed Glass Component Substrate(s)", U.S. Appl. No. 15/154,088, filed May 13, 2016 (56 pages).
Brodsky et al., "Circuit Layouts of Tamper-Respondent Sensors", U.S. Appl. No. 15/187,002, filed Jun. 20, 2016 (110 pages).
Brodsky et al., "Tamper-Respondent Assemblies with Enclosure-to-Board Protection", U.S. Appl. No. 15/193,525, filed Jun. 27, 2016 (54 pages).
Fisher et al., "Applying Pressure to Adhesive Using CTE Mismatch Between Components", U.S. Appl. No. 15/193,556, filed Jun. 27, 2016 (71 pages).
Busby et al., "Tamper-Respondent Assembly with Nonlinearity Monitoring", U.S. Appl. No. 15/194,738, filed Jun. 28, 2016 (48 pages).
Dangler et al., "Tamper-Respondent Sensors with Formed Flexible Layer(s)", U.S. Appl. No. 15/249,663, filed Aug. 29, 2016 (109 pages).
Brodsky et al., "Overlapping, Discrete Tamper-Respondent Sensors", U.S. Appl. No. 15/249,671, filed Aug. 29, 2016 (109 pages).
Dangler et al., "Tamper-Respondent Assemblies with Region(s) of Increased Susceptibility to Damage", U.S. Appl. No. 15/249,676, filed Aug. 29, 2016 (110 pages).
Isaacs et al., Office Action for U.S. Appl. No. 14/637,501, filed Mar. 4, 2015, dated May 4, 2016 (20 pages).
Fisher et al., Office Action for U.S. Appl. No. 14/963,681, filed Dec. 9, 2015, dated May 6, 2016 (10 pages).
Brodsky et al., Notice of Allowance for U.S. Appl. No. 14/974,036, filed Dec. 18, 2015, dated Jun. 3, 2016 (18 pages).
Fisher et al., Office Action for U.S. Appl. No. 14/865,686, filed Sep. 25, 2015, dated Jun. 29, 2016 (17 pages).
Fisher et al., Notice of Allowance for U.S. Appl. No. 14/963,681, filed Dec. 9, 2015, dated Jul. 5, 2016 (7 pages).
Brodsky et al., Office Action for U.S. Appl. No. 14/865,651, filed Sep. 25, 2015, dated Jul. 13, 2016 (10 pages).

* cited by examiner

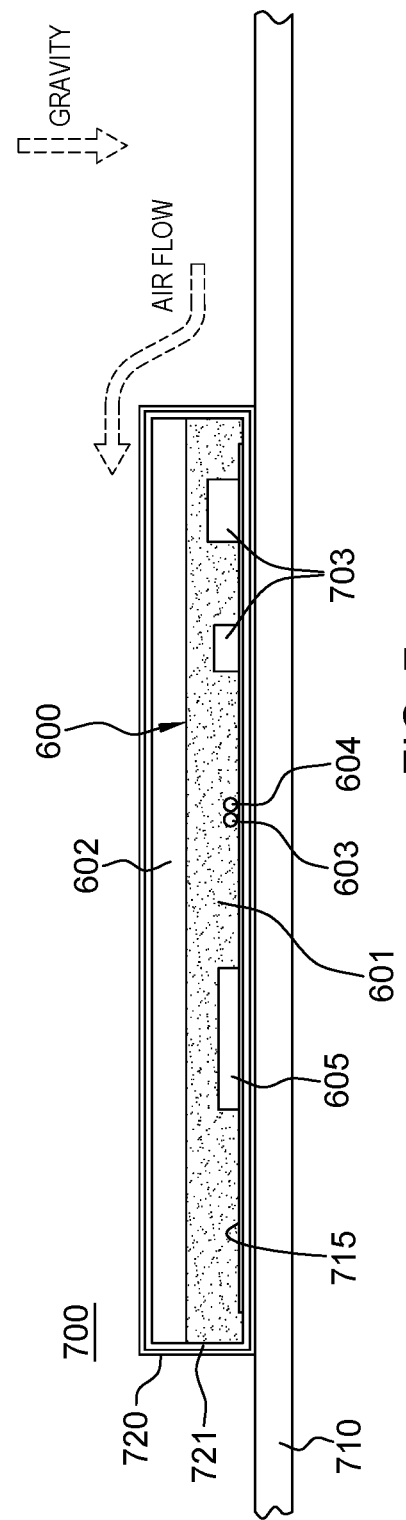

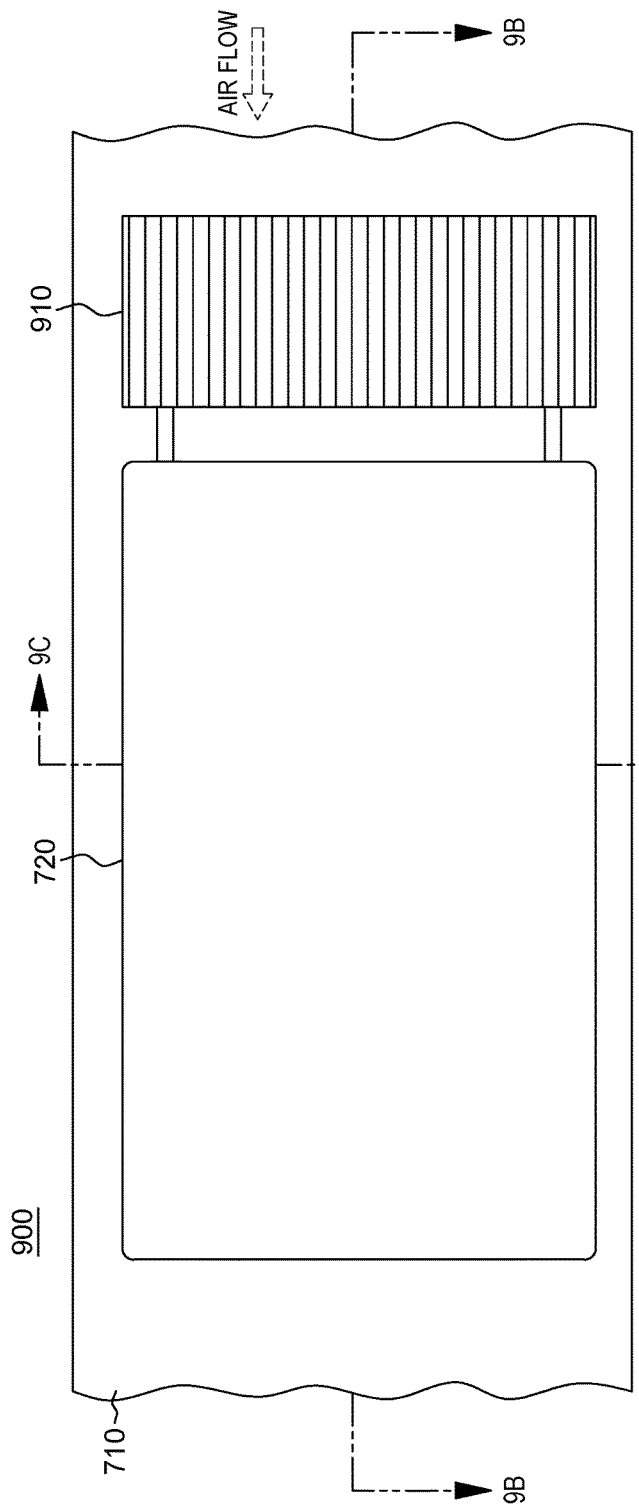
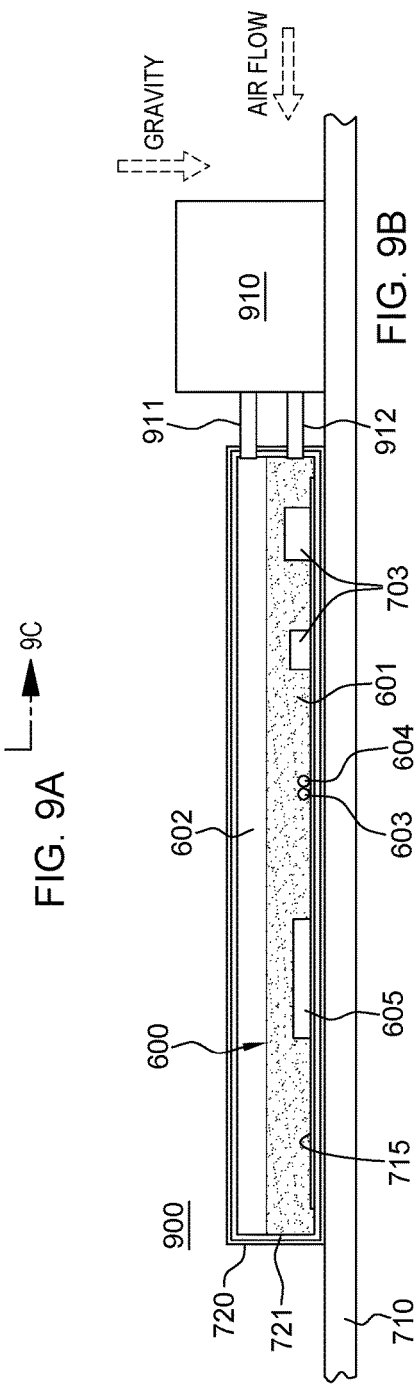
FIG. 9A
FIG. 9B

US 9,904,811 B2

TAMPER-PROOF ELECTRONIC PACKAGES WITH TWO-PHASE DIELECTRIC FLUID

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

SUMMARY

Provided herein, in one or more aspects, is a tamper-proof electronic package which includes: an enclosure to enclose, at least in part, at least one electronic component within a secure volume; a two-phase dielectric fluid within the secure volume; and a tamper-respondent detector to monitor, at least in part, temperature and pressure of the two-phase dielectric fluid, wherein in operation, the two-phase dielectric fluid deviates from an established saturation line thereof within the secure volume with an intrusion event into the secure volume, and the tamper-respondent detector detects, from the monitoring of the temperature and pressure of the two-phase dielectric fluid, the deviation from the established saturation line, and thereby the intrusion event.

In one or more other aspects, a tamper-proof electronic package is provided, which includes: at least one electronic component; an enclosure enclosing, at least in part, the at least one electronic component within a secure volume; a two-phase dielectric fluid within the secure volume; and a tamper-respondent detector within the secure volume to monitor, at least in part, temperature and pressure of the two-phase dielectric fluid, wherein in operation, the two-phase dielectric fluid deviates from an established saturation line thereof within the secure volume with an intrusion event into the secure volume, and the tamper-respondent detector detects, from the monitoring of the temperature and pressure of the two-phase dielectric fluid, deviation from the established saturation line, and thereby the intrusion event.

In one or more further aspects, a method of fabricating a tamper-proof electronic package is provided which includes: providing an enclosure enclosing, at least in part, at least one electronic component within a secure volume; providing a two-phase dielectric fluid within the secure volume; and providing a tamper-respondent detector to monitor, at least in part, temperature and pressure of the two-phase dielectric fluid, wherein in operation, the two-phase dielectric fluid deviates from an established saturation line thereof within the secure volume with an intrusion event in the secure volume, and the tamper-respondent detector detects, from the monitoring of the temperature and pressure of the two-phase dielectric fluid, deviation from the established saturation line, and thereby the intrusion event.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 7 is a cross-sectional elevational view of a further embodiment of a tamper-proof electronic package, which includes a two-phase dielectric fluid within a secure volume defined by an enclosure and at least one tamper-respondent sensor along an inner surface thereof, in accordance with one or more aspects of the present invention;

FIG. 9A is a plan view of a further embodiment of a tamper-proof electronic package, which includes a two-phase dielectric fluid within a secure volume defined by an enclosure, and where an external condenser is utilized to facilitate dissipation of heat from one or more electronic components within the secure volume, in accordance with one or more aspects of the present invention;

FIG. 9B is a cross-sectional elevational view of the tamper-proof electronic package of FIG. 9A, taken along line 9B-9B thereof, in accordance with one or more aspects of the present invention;

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for instance, for establishing a cooled, secure volume about an electronic component(s) or electronic assembly to be protected.

Figure 1:
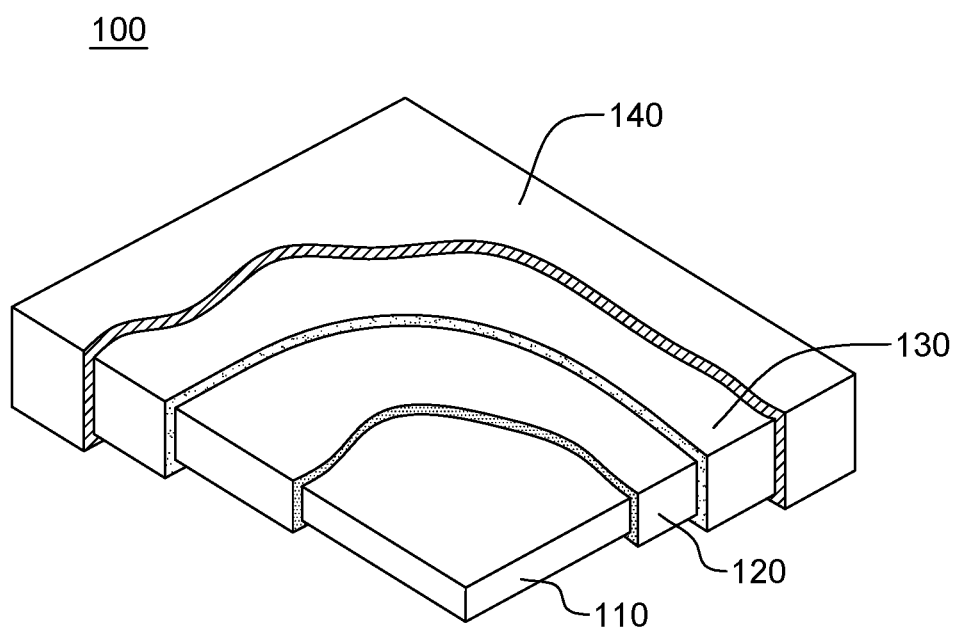
FIG. 1 is a partial cut-away of one embodiment of a tamper-proof electronic package.

Reference is first made to FIG. 1 of the drawings, which illustrates one approach for an electronic package 100 configured as a tamper-proof electronic package for purposes of discussion. In the depicted embodiment, an electronic assembly enclosure 110 is provided containing, for instance, an electronic assembly, which in one embodiment may include a plurality of electronic components, such as an encryption and/or decryption module and associated memory. The encryption and/or decryption module may comprise security-sensitive information with, for instance, access to the information stored in the module requiring use of a variable key, and with the nature of the key being stored in the associated memory within the enclosure.

In one or more implementations, a tamper-proof electronic package such as depicted is configured or arranged to detect attempts to tamper-with or penetrate into electronic assembly enclosure 110. Accordingly, electronic assembly enclosure 110 also includes, for instance, a monitor circuit which, if tampering is detected, activates an erase circuit to erase information stored within the associated memory, as well as the encryption and/or decryption module within the communications card. These components may be mounted on, and interconnected by, a multilayer circuit board, such as a printed circuit board or other multilayer substrate, and be internally or externally powered via a power supply provided within the electronic assembly enclosure.

In the embodiment illustrated, and as one example only, electronic assembly enclosure 110 may be surrounded by a tamper-respondent sensor 120, an encapsulant 130, and an outer, thermally conductive enclosure 140. In one or more implementations, tamper-respondent sensor 120 may include a tamper-respondent laminate that is folded around electronic assembly enclosure 110, and encapsulant 130 may be provided in the form of a molding. Tamper-respondent sensor 120 may include various detection layers, which are monitored through, for instance, a ribbon cable by the enclosure monitor, against attempts to penetrate enclosure 110 and damage the enclosure monitor or erase circuit, before information can be erased from the encryption module. The tamper-respondent sensor may be, for example, any such article commercially available or described in various publications and issued patents, or any enhanced article such as disclosed herein.

By way of example, tamper-respondent sensor 120 may be formed as a tamper-respondent laminate comprising a number of separate layers with, for instance, an outermost lamination-respondent layer including a matrix of, for example, diagonally-extending or sinusoidally-extending, conductive or semi-conductive lines printed onto a regular, thin insulating film. The matrix of lines forms a number of continuous conductors which would be broken if attempts are made to penetrate the film. The lines may be formed, for instance, by printing carbon-loaded Polymer Thick Film (PTF) ink onto the film and selectively connecting the lines on each side, by conductive vias, near the edges of the film. Connections between the lines and an enclosure monitor of the communications card may be provided via, for instance, one or more ribbon cables. The ribbon cable itself may be formed of lines of conductive ink printed onto an extension of the film, if desired. Connections between the matrix and the ribbon cable may be made via connectors formed on one edge of the film. As noted, the laminate may be wrapped around the electronic assembly enclosure to define the tamper-respondent sensor 120 surrounding enclosure 110.

In one or more implementations, the various elements of the laminate may be adhered together and wrapped around enclosure 110, in a similar manner to gift-wrapping a parcel, to define the tamper-respondent sensor shape 120. The assembly may be placed in a mold which is then filled with, for instance, cold-pour polyurethane, and the polyurethane may be cured and hardened to form an encapsulant 130. The encapsulant may, in one or more embodiments, completely surround the tamper-respondent sensor 120 and enclosure 110, and thus form a complete environmental seal, protecting the interior of the enclosure. The hardened polyurethane is resilient and increases robustness of the electronic package in normal use. Outer, thermally conductive enclosure 140 may optionally be provided over encapsulant 130 to, for instance, provide further structural rigidity to the electronic package.

When considering tamper-proof packaging, the electronic package needs to maintain defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-2 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs). Security Level 4 cryptographic modules are useful for operation in physically unprotected environments. Security Level 4 also protects a cryptographic module against a security compromise due to environmental conditions or fluctuations outside the module's normal operating ranges for voltage and temperature. Intentional excursions beyond the normal operating ranges may be used by an attacker to thwart the cryptographic module's defenses. The cryptographic module is required to either include specialized environmental protection features designed to detect fluctuations and zeroize, critical security parameters, or to undergo rigorous environmental failure testing to provide reasonable assurances that the module will not be affected by fluctuations outside the normal operating range in a manner than can compromise the security of the module.

To address the demands for ever-improving anti-intrusion technology, and the higher-performance encryption/decryption functions being provided, enhancements to the tamper-proof, tamper-evident packaging for the electronic component(s) or assembly at issue are desired.

Numerous enhancements are described hereinbelow to, for instance, tamper-proof electronic packages and tamper-respondent sensors. The numerous inventive aspects described herein may be used singly, or in any desired combination. Additionally, in one or more implementations, the enhancements to tamper-proof electronic packaging described herein may be provided to work within defined space limitations for existing packages. For instance, one or more of the concepts described may be configured to work with peripheral component interconnect express (PCIe) size limits.

Disclosed hereinbelow with reference to FIGS. 2A-11 are various approaches and/or enhancements to creating, for instance, a secure volume for accommodating one or more electronic components, such as one or more encryption and/or decryption modules and associated components of, for instance, a communications card or other electronic assembly to be protected.

Figure 2A:
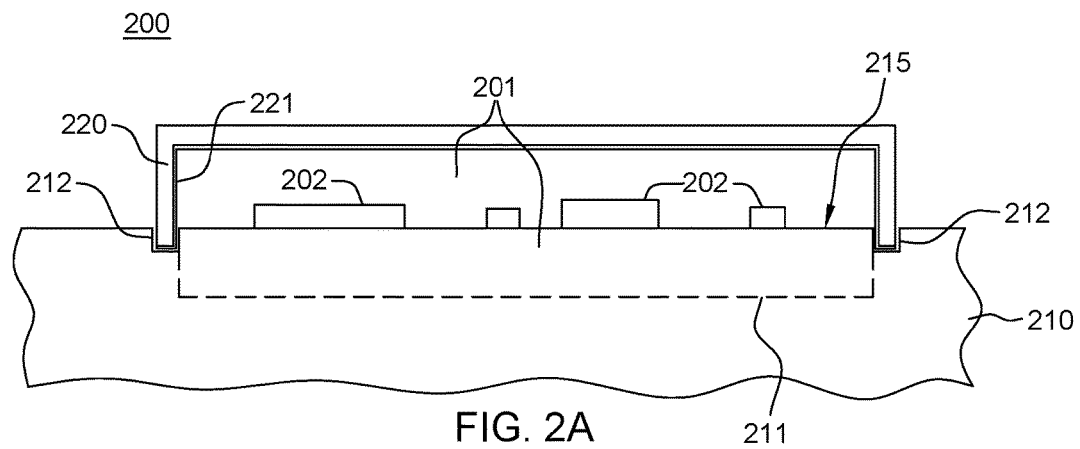
FIG. 2A is a cross-sectional elevational view of another embodiment of a tamper-proof electronic package, or tamper-respondent assembly, which includes (in part) an enclosure, and a multi-layer circuit board with an embedded tamper-respondent sensor, in accordance with one or more aspects of the present invention.
Figure 2B:
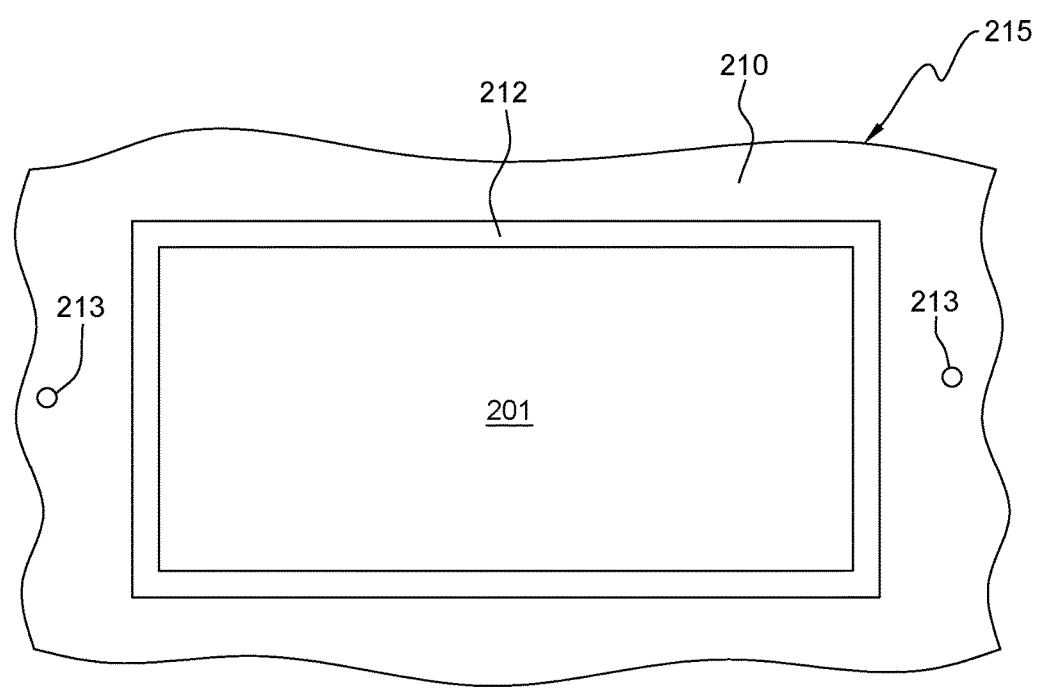
FIG. 2B is a top plan view of the multilayer circuit board of FIG. 2A, depicting one embodiment of the secure volume defined, in part, within the multilayer circuit board, in accordance with one or more aspects of the present invention.

FIGS. 2A & 2B depict one embodiment of a tamper-proof electronic package 200, or tamper-respondent assembly, which comprises one or more electronic components, such as a circuit 215 and/or electronic devices (or elements) 202 to be protected, in accordance with one or more further aspects of the present invention.

Referring collectively to FIGS. 2A & 2B, circuit 215 resides on or is embedded within a multilayer circuit board 210, which also has an embedded tamper-respondent sensor 211 that facilitates defining, in part, a secure volume 201 associated with multilayer circuit board 210 that (in one or more embodiments) extends into multilayer circuit board 210. In particular, in the embodiment of FIGS. 2A & 2B, secure volume 201 may exist partially within multilayer circuit board 210, and partially above multilayer circuit board 210. One or more electronic devices 202 are mounted to multilayer circuit board 210 within secure volume 201 and may comprise, for instance, one or more encryption modules and/or decryption modules, and/or associated components, to be protected within the tamper-proof electronic package. In one or more implementations, the one or more electronic components to be protected may comprise, for instance, a secure communications card of a computer system.

Tamper-proof electronic package 200 further includes an enclosure 220, such as a pedestal-type enclosure, mounted to multilayer circuit board 210 within, for instance, a continuous groove (or trench) 212 formed within an upper surface of multilayer circuit board 210, and secured to the multilayer circuit board 210 via, for instance, a structural adhesive disposed within continuous groove 212. In one or more embodiments, enclosure 220 may comprise a thermally conductive material and operate as a heat sink for facilitating cooling of the one or more electronic components 202 within the secure volume. A security mesh or tamper-respondent sensor 221 may be associated with enclosure 220, for example, wrapping around the inner surface of enclosure 220, to facilitate defining, in combination with tamper-respondent sensor 211 embedded within multilayer circuit board 210, secure volume 201. In one or more implementations, tamper-respondent sensor 221 may extend down into continuous groove 212 in multilayer circuit board 210 and may, for instance, even wrap partially or fully around the lower edge of enclosure 220 within continuous groove 212 to provide enhanced tamper detection where enclosure 220 couples to multilayer circuit board 210. In one or more implementations, enclosure 220 may be securely affixed to multilayer circuit board 210 using, for instance, a bonding material such as an epoxy or other adhesive.

Briefly described, tamper-respondent sensor 221 may comprise, in one or more examples, one or more tamper-respondent layers which include circuit lines or traces provided on one or both sides of a flexible layer, which in one or more implementations, may be a flexible insulating layer or film. The circuit lines on one or both sides of the flexible layer may be of a line width and have a pitch or line-to-line spacing such that piercing of the layer at any point results in damage to one or more of the circuit lines or traces. In one or more implementations, the circuit lines may be electrically connected in-series or parallel to define one or more conductors which may be electrically connected in a network to an enclosure monitor, which monitors, for instance, resistance on the lines. Detection of an increase or other change in resistance caused by cutting or damaging one or more of the lines, will cause information within the secure volume to be automatically erased. The conductive lines of the tamper-respondent sensor may be in any desired pattern, such as a sinusoidal pattern, to make it more difficult to breach the tamper-respondent layer without detection.

A variety of materials may be employed to form the circuit lines. For instance, the circuit lines may be formed of a conductive ink (such as a carbon-loaded conductive ink) printed onto one or both sides of one or more flexible layers in a stack of flexible layers. Alternatively, a metal or metal alloy could be used to form the circuit lines, such as copper, silver, intrinsically-conductive polymers, carbon ink, or nickel phosphorous (NiP), or Omega-ply®, offered by Omega Technologies, Inc., of Culver City, Calif. (USA), or Ticer™, offered by Ticer Technologies, Chandler, Ariz. (USA). The process employed to form the fine circuit lines or traces is dependent, in part, on the choice of materials used for the circuit lines. For instance, if copper circuit lines are fabricated, then additive processing, such as plating of copper traces, or subtractive processing, such as etching away unwanted copper between trace lines, may be employed.

As noted, in one or more implementations, the circuit lines of the tamper-respondent sensor(s) lining the inner surface(s) of enclosure 220, or even printed directly onto one or more layers formed over the inner surface of enclosure 220, may be connected to define one or more detect networks. For instance, the circuit lines may include one or more resistive circuit lines by selecting the line material, line width, and line length to provide a desired resistance per line.

If a flexible layer is used over the inner surface of enclosure 220, then the flexible layer may be formed of a crystalline polymer material. For instance, the crystalline polymer could comprise polyvinylidene difluoride (PVDF), or Kapton, or other crystalline polymer material. Advantageously, a crystalline polymer may be made much thinner, while still maintaining structural integrity of the flexible substrate, which also allows for enhanced folding, and greater reliability of the sensor after folding.

As depicted in FIG. 2B, one or more external circuit connection vias 213 may be provided within multilayer circuit board 210 for electrically connecting to the one or more electronic components within secure volume 201. These one or more external circuit connection vias 213 may electrically connect to one or more external signal lines or planes (not shown) embedded within multilayer circuit board 210 and extending, for instance, into a secure base region of (or below) secure volume 201, as explained further below. Electrical connections to and from secure volume 201 may be provided by coupling to such external signal lines or planes within the multilayer circuit board 210.

As noted, secure volume 201 may be sized to house one or more electronic components to be protected, and may be constructed to extend into multilayer circuit board 210. In one or more implementations, multilayer circuit board 210 includes electrical interconnect within the secure volume 201 defined in the board, for instance, for electrically connecting one or more tamper-respondent layers of the embedded tamper-respondent sensor 211 to associated monitor circuitry also disposed within secure volume 201, along with, for instance, one or more daughter cards, such as memory DIMMs, PCIe cards, processor cards, etc.

Note that the packaging embodiment depicted in FIGS. 2A & 2B is presented by way of example only. Other configurations of enclosure 220, or multilayer circuit board 210 may be employed, and/or other approaches to coupling enclosure 220 and multilayer circuit board 210 may be used. For instance, in one or more alternate implementations, enclosure 220 may be securely affixed to an upper surface of multilayer circuit board 210 (without a continuous groove) using, for instance, a structural bonding material such as an epoxy or other adhesive.

Figure 3:
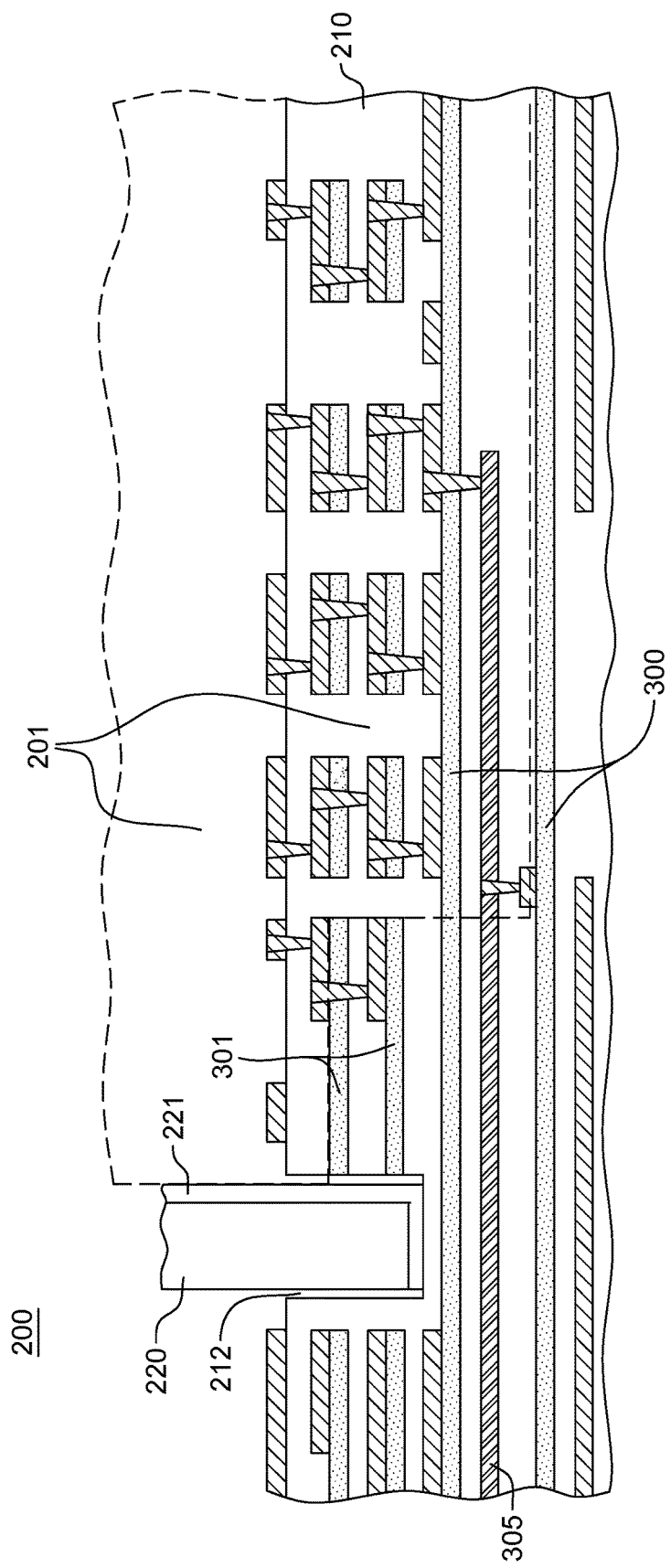
FIG. 3 is a partial cross-sectional elevational view of a more detailed embodiment of the tamper-proof electronic package of FIGS. 2A & 2B comprising (in part) an enclosure, and a multilayer circuit board with embedded tamper-respondent sensor, in accordance with one or more aspects of the present invention.

By way of further example, FIG. 3 depicts a partial cross-sectional elevational view of a more detailed embodiment of tamper-proof electronic package 200, and in particular, of multilayer circuit board 210, to which enclosure 220 is secured. In this configuration, the embedded tamper-respondent sensor includes multiple tamper-respondent layers including, by way of example, at least one tamper-respondent mat (or base) layer 300, and at least one tamper-respondent frame 301. In the example depicted, two tamper-respondent mat layers 300 and two tamper-respondent frames 301 are illustrated, by way of example only. The lower-most tamper-respondent mat layer 300 may be a continuous sense or detect layer extending completely below the secure volume being defined within and/or above multilayer circuit board 210. One or both tamper-respondent mat layers 300 below secure volume 201 may be partitioned into multiple circuit zones. Within each tamper-respondent mat layer, or more particularly, within each circuit zone of each tamper-respondent mat layer, multiple circuits or conductive traces may be provided in any desired configuration. Further, the conductive traces within the tamper-respondent layers may be implemented as, for instance, a resistive layer.

As illustrated, one or more external signal lines or planes 305 may enter secure volume 201 between, in one embodiment, two tamper-respondent mat layers 300, and then electrically connect upwards into the secure volume 201 through one or more conductive vias, arranged in any desired location and pattern. In the configuration depicted, the one or more tamper-respondent frames 301 are disposed at least inside of the area defined by continuous groove 212 accommodating the base of enclosure 220. Together with the tamper-respondent sensor(s) 221 associated with enclosure 220, tamper-respondent frames 301, and tamper-respondent mat layers 300, define secure volume 201, which may extend, in part, into multilayer circuit board 210. With secure volume 201 defined, in part, within multilayer circuit board 210, the external signal line(s) 305 may be securely electrically connected to, for instance, the one or more electronic components mounted to, or of, multilayer circuit board 210 within secure volume 201. In addition, secure volume 201 may accommodate electrical interconnection of the conductive traces of the multiple tamper-respondent layers 300, 301, for instance, via appropriate monitor circuitry.

Added security may be provided by extending tamper-respondent mat layers 300 (and if desired, tamper-respondent frames 301) outward past the periphery of enclosure 220. In this manner, a line of attack may be made more difficult at the interface between enclosure 220 and multilayer circuit board 210 since the attack would need to clear, for instance, tamper-respondent mat layers 300, the enclosure 220, as well as the tamper-respondent frames 301 of the embedded tamper-respondent sensor.

Numerous variations on multilayer circuit board 210 of FIGS. 2A-3 are possible. For instance, in one embodiment, the embedded tamper-respondent sensor may include one or more tamper-respondent mat layers 300 and one or more tamper-respondent frames 301, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, would be facilitated.

Note also that, once within the secure volume is defined in part within multilayer circuit board 210, conductive vias within the secure volume between layers of multilayer circuit board 210 may be either aligned, or offset, as desired, dependent upon the implementation. Alignment of conductive vias may facilitate, for instance, providing a shortest connection path, while offsetting conductive vias between layers may further enhance security of the tamper-proof electronic package by making an attack into the secure volume through or around one or more tamper-respondent layers of the multiple tamper-respondent layers more difficult.

The tamper-respondent layers of the embedded tamper-respondent sensor formed within the multilayer circuit board of the electronic circuit or electronic package may include multiple conductive traces or lines formed between, for instance, respective sets of input and output contacts or vias at the trace termination points. Any pattern and any number of conductive traces or circuits may be employed in defining a tamper-respondent layer or a tamper-respondent circuit zone within a tamper-respondent layer. For instance, 4, 6, 8, etc., conductive traces may be formed in parallel (or otherwise) within a given tamper-respondent layer or circuit zone between the respective sets of input and output contacts to those conductive traces.

Figure 4:
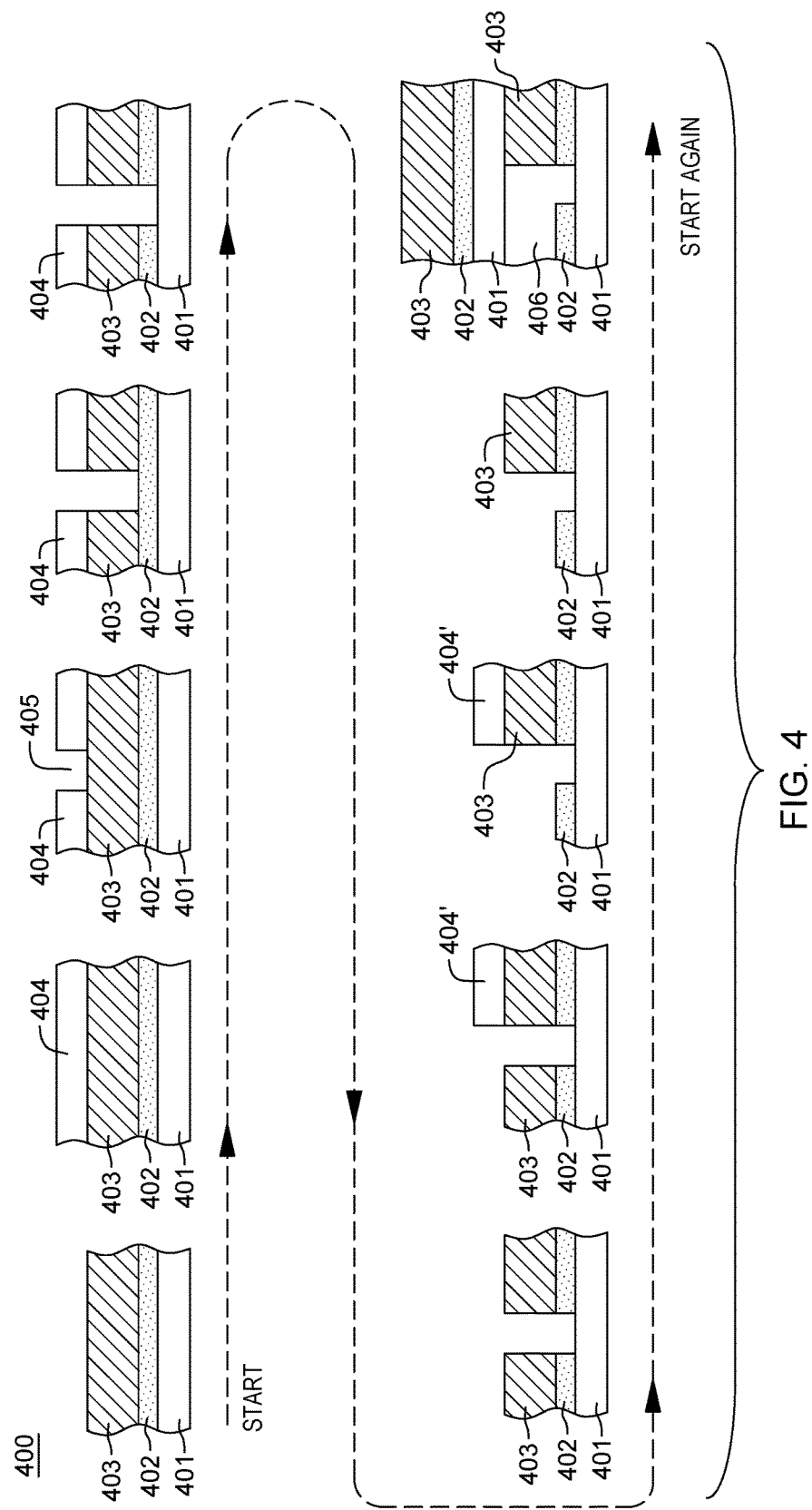
FIG. 4 depicts one embodiment of a process of fabricating a multilayer circuit board with an embedded tamper-respondent sensor, in accordance with one or more aspects of the present invention.

In one or more implementations, the multilayer circuit board may be a multilayer wiring board or printed circuit board formed, for instance, by building up the multiple layers of the board. FIG. 4 illustrates one embodiment for forming and patterning a tamper-respondent layer within such a multilayer circuit board.

As illustrated in FIG. 4, in one or more implementations, a tamper-respondent layer, such as a tamper-respondent mat layer or a tamper-respondent frame disclosed herein, may be formed by providing a material stack comprising, at least in part, a structural layer 401, such as a pre-preg (or pre-impregnated) material layer, a trace material layer 402 for use in defining the desired trace patterns, and an overlying conductive material layer 403, to be patterned to define conductive contacts or vias electrically connecting to the pattern of traces being formed within the trace material layer 402, for instance, at trace terminal points. In one or more implementations, the trace material layer 402 may comprise nickel phosphorous (NiP), and the overlying conductive layer 403 may comprise copper. Note that these materials are identified by way of example only, and that other trace and/or conductive materials may be used within the build-up 400.

A first photoresist 404 is provided over build-up 400, and patterned with one or more openings 405, through which the overlying conductive layer 403 may be etched. Depending on the materials employed, and the etch processes used, a second etch process may be desired to remove portions of trace material layer 402 to define the conductive traces of the subject tamper-respondent layer. First photoresist 404 may then be removed, and a second photoresist 404' is provided over the conductive layer 403 features to remain, such as the input and output contacts. Exposed portions of conductive layer 403 are then etched, and the second photoresist 404' may be removed, with any opening in the layer being filled, for instance, with an adhesive (or pre-preg) and a next build-up layer is provided, as shown. Note that in this implementation, most of overlying conductive layer 403 is etched away, with only the conductive contacts or vias remaining where desired, for instance, at the terminal points of the traces formed within the layer by the patterning of the trace material layer 402. Note that any of a variety of materials may be employed to form the conductive lines or traces within a tamper-respondent layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which could be employed include OhmegaPly®, offered by Ohmega Technologies, Inc., of Culver City, Calif. (USA), or Ticer™, offered by Ticer Technologies of Chandler, Ariz. (USA).

The trace lines or circuits within the tamper-respondent layers, and in particular, the tamper-respondent circuit zones, of the embedded tamper-respondent sensor, along with the tamper-respondent detector monitoring the enclosure, may be electrically connected to detect or compare circuitry provided, for instance, within secure volume 201 (FIG. 2A) of the tamper-proof electronic package. The detect circuitry may include various bridge or compare circuits, and conventional printed wiring board electrical interconnect inside secure volume 201 (FIG. 2A), for instance, located within the secure volume defined by the tamper-respondent frames 301 (FIG. 3), and the tamper-respondent mat layers 300 (FIG. 3).

Note that advantageously, different tamper-respondent circuit zones on different tamper-respondent layers may be electrically interconnected into, for instance, the same comparator circuit, Wheatstone bridge, or similar monitor or detect circuitry. Thus, any of a large number of interconnect configurations may be possible. For instance, if each of two tamper-respondent mat layers contains 30 tamper-respondent circuit zones, and each of two tamper-respondent frames contains 4 tamper-respondent circuit zones, then, for instance, the resultant 68 tamper-respondent circuit zones may be connected in any configuration within the secure volume to create the desired arrangement of circuit networks within the secure volume being monitored for changes in resistance or tampering. Note in this regard, that the power supply or battery for the tamper-respondent sensor may be located external to the secure volume, with the sensor being configured to trip and destroy any protected or critical data if the power supply or battery is tampered with.

Figure 5:
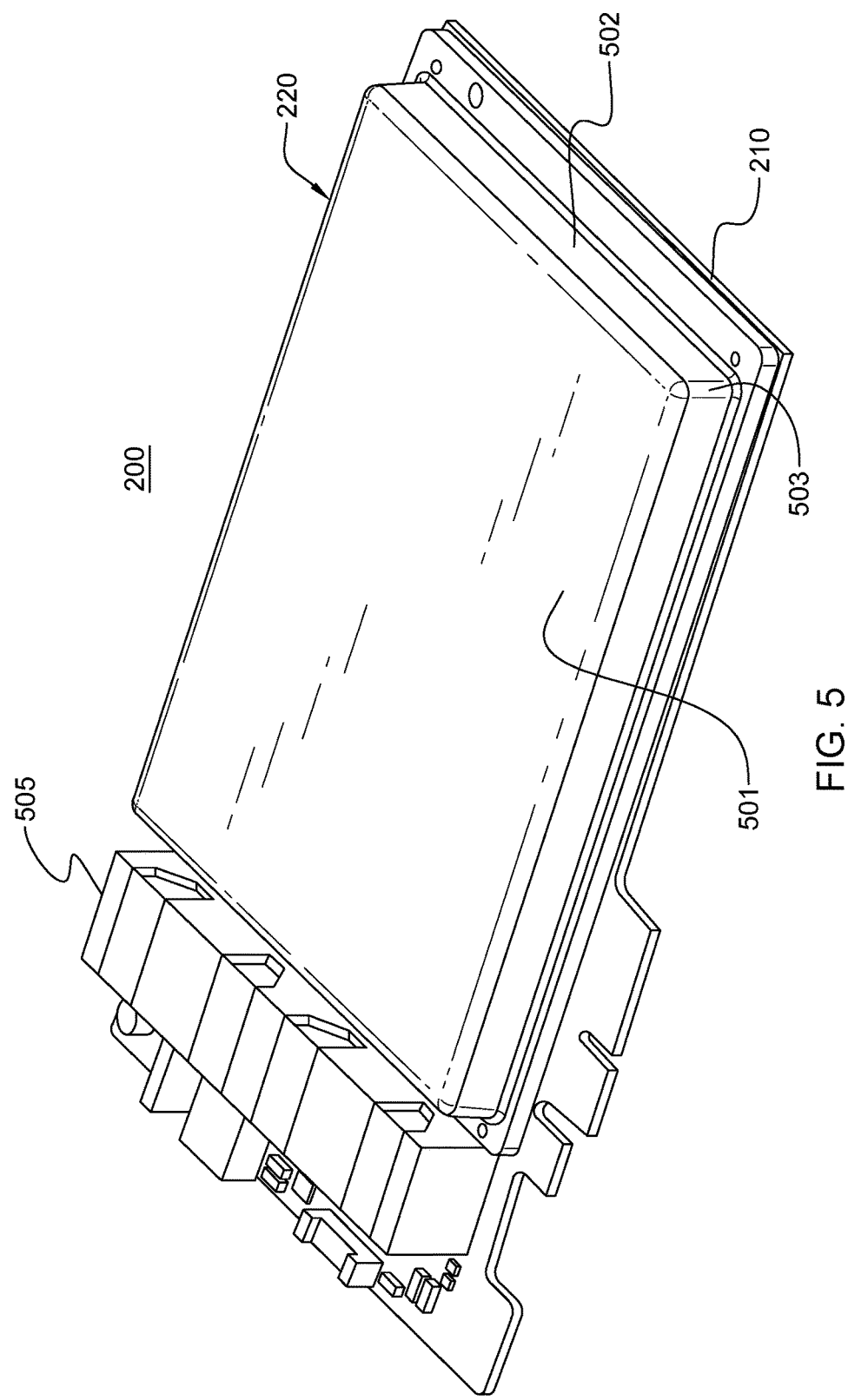
FIG. 5 is an isometric view of one embodiment of a tamper-proof electronic package, in accordance with one or more aspects of the present invention.

By way of further example, an isometric view of one embodiment of a tamper-proof electronic package 200 is depicted in FIG. 5, wherein an enclosure 220 is shown sealed to multilayer circuit board 210 to define a secure volume about one or more electronic components, as described herein. In the embodiment depicted, enclosure 220 may be formed of a thermally conductive material, and includes a main surface 501 and sidewall(s) 502 which include sidewall corners 503. An inner surface of enclosure 220 would include an inner main surface, and an inner sidewall surface corresponding to main surface 501 and sidewall(s) 502 respectively, with the inner main surface and inner sidewall surfaces being covered, at least in part, by one or more tamper-respondent sensors, such as described above. A power supply 505 or battery for the tamper-respondent sensor may be located, as depicted in this embodiment, external to the secure volume, with the tamper-respondent detector being configured to trip and destroy any protected or critical data if the power supply or battery is tampered with. Enclosure 220 may be adhered or mechanically affixed to multilayer circuit board 210, which as noted above, may include its own embedded tamper-respondent sensor(s).

As noted, tamper-proof electronic packaging is required for tamper protection of certain electronic components, such as certain communication or cryptography cards. However, the presence of one or more tamper-respondent sensors, such as the flexible sensors described above, may impede heat transfer from the active electronic components within the secure volume to the environment, potentially leading to reduced component reliability, and/or limitations on the operating environment. To address this concern, disclosed herein are enhanced tamper-proof electronic packages which facilitate cooling of the electronic components within the secure volume, while still allowing for, and even improving upon, tamper proofing of the electronics. The cooling is facilitated by providing a two-phase dielectric fluid or coolant within the secure volume. The two-phase dielectric fluid (or volatile dielectric fluid) facilitates heat transfer by, for instance, pool boiling at one or more surfaces of the electronic components within the secure volume with dielectric fluid vapor rising within the secure volume and condensing at, for instance, one or more condensing surfaces within a vapor region of the secure volume. The one or more condensing surfaces may be a variety of different surfaces, as discussed herein. Note, in this regard, that the two-phase dielectric fluid and detection approaches described herein may be employed in combination with a wide variety of security enclosures. FIGS. 6A-10B depict various non-limiting examples of tamper-proof electronic packaging employing a two-phase dielectric fluid and tamper-respondent detector, in accordance with one or more aspects of the present invention.

Generally stated, a tamper-proof electronic package such as disclosed herein includes: an enclosure to enclose, at least in part, at least one electronic component within a secure volume; a two-phase dielectric fluid within the secure volume; and a tamper-respondent detector to monitor, at least in part, temperature and pressure of the two-phase dielectric fluid. In operation, the two-phase dielectric fluid deviates from an established saturation line (or saturation curve) thereof within the secure volume with an intrusion event into the secure volume, and the tamper-respondent detector detects, from the monitoring of the temperature and pressure of the two-phase dielectric fluid, deviation from the established saturation line, and thereby the intrusion event. Note in this regard that "saturation line" or "saturation curve" refers to an established saturation system within the secure volume with the two-phase dielectric fluid substantially filling the open space of secure volume, for instance, the space within the enclosure and above the circuit board.

In one or more implementations, the at least one electronic component is immersed within the two-phase dielectric fluid within the secure volume and, in operation, the two-phase dielectric fluid boils at the at least one electronic component and condenses it at an inner condensing surface of the tamper-proof electronic package within a vapor region of the secure volume. By way of further example, one or more tamper-respondent sensors may be coupled to an inner surface of the enclosure, and the tamper-respondent sensor(s) may include circuit lines defining one or more tamper-detect networks, wherein the inner condensing surface may be a surface of the tamper-respondent sensor(s), and the tamper-respondent detector further monitors the one or more tamper-detect networks for the intrusion event. In these configurations, multiple layers of tamper protection are provided by the tamper-respondent sensor(s) and the two-phase dielectric fluid and tamper-respondent detector.

Further, in one or more embodiments, the tamper-proof electronic package may include a multilayer circuit board, with the enclosure being coupled to the multilayer circuit board, and together, the enclosure and the multilayer circuit board enclose the at least one electronic component. A tamper-respondent sensor may be embedded within the multilayer circuit board, with the embedded tamper-respondent sensor defining, at least in part, the secure volume, and with the tamper-respondent sensor comprising one or more additional tamper detect networks embedded within the multilayer circuit board.

By way of further example, the tamper-proof electronic packages disclosed herein may include a thermally conductive condenser with a plurality of thermally conductive fins disposed within the vapor region of the secure volume, where the inner condensing surface may be a surface of the thermally conductive condenser. In one or more embodiments, the tamper-proof electronic package may further include one or more tamper-respondent sensors coupled to an inner surface of the enclosure, with the tamper-respondent sensor(s) comprising circuit lines defining one or more tamper-detect networks. In these configurations, the tamper-respondent sensor(s) may cover an inner main surface of the enclosure, and the thermally conductive condenser may overly, at least in part, the tamper-respondent sensor(s) such that the tamper-respondent sensor(s) is disposed, at least in part, between the enclosure and the thermally conductive condenser.

In one or more implementations, the tamper-proof electronic package may include an external condenser, with the external condenser being coupled in fluid communication with the secure volume via a vapor fluid tube and a liquid fluid tube. In these configurations, the dielectric fluid vapor passes from the secure volume to the external condenser through the vapor fluid tube, condenses within the external condenser, and is returned to the secure volume via the liquid fluid tube as liquid dielectric fluid. By way of example, the external condenser may be an external, air-cooled condenser, or if desired, a liquid-cooled condenser.

In one or more implementations, the tamper-respondent detector may determine a saturation line residual using the monitored temperature and pressure of the two-phase dielectric fluid within the secure volume, and then determine whether the saturation line residual exceeds a predefined saturation line residual threshold. The tamper-respondent detector detects occurrence of the intrusion event when the determined saturation line residual exceeds the predetermined saturation line residual threshold. In combination with this detecting, or as an alternative approach, the tamper-respondent detector could monitor ambient temperature external to the enclosure and detect occurrence of an intrusion event when the monitored ambient temperature equals or exceeds the monitored temperature of the two-phase dielectric fluid within the secure volume adjusted by a predefined tolerance value or percentage.

Figure 6A:
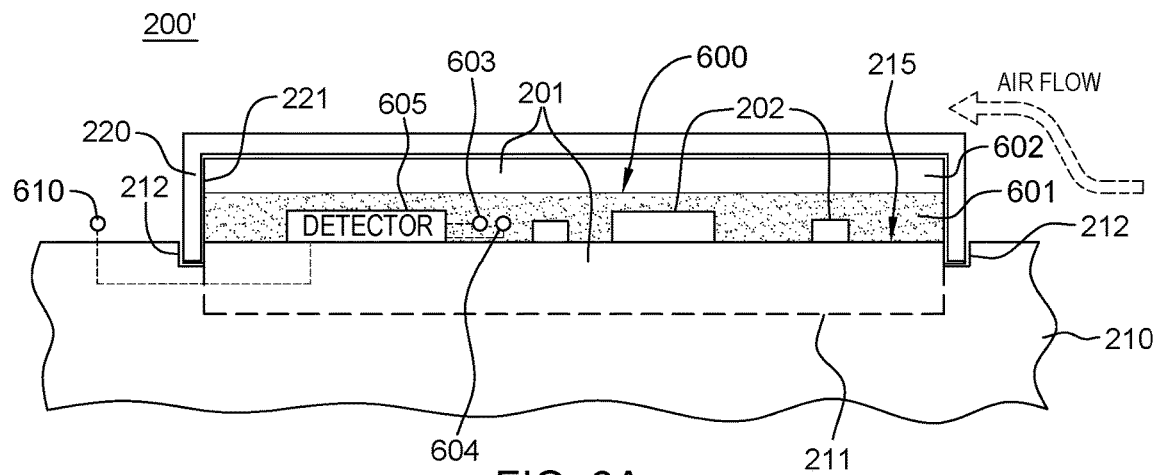
FIG. 6A is a cross-sectional elevational view of a further embodiment of a tamper-proof electronic package, or tamper-respondent assembly, which includes a two-phase dielectric fluid within the secure volume defined, in part, by the enclosure and the multilayer circuit board with embedded tamper-respondent sensor, in accordance with one or more aspects of the present invention.

FIG. 6A depicts one embodiment of a tamper-proof electronic package 200' similar to tamper-proof electronic package 200 described above in connection with FIGS. 2A-4. In this embodiment, tamper-proof electronic package 200' includes enclosure 220 mounted to multilayer circuit board 210 within, for instance, continuous grove 212 formed in the upper surface of multilayer circuit board 210. A security mesh or tamper-respondent sensor 221 is associated with enclosure 220, for example, wrapping around the inner surface of enclosure 220 to facilitate defining secure volume 201, that is, in combination with an embedded tamper-respondent sensor 211 embedded within multilayer circuit board 210. Secure volume 201 above multilayer circuit board 210 is sized to accommodate one or more electronic components, such as a circuit 215 and/or electronic devices (or elements) 202 to be protected.

Tamper-proof electronic package 200' further includes a two-phase dielectric fluid 600 within secure volume 201, filling the compartment defined between an upper surface of multilayer circuit board 210 and the at least one tamper-respondent sensor 221 on the inner surface of enclosure 220. The two-phase dielectric fluid 600 may be a variety of volatile dielectric fluids or refrigerants, such as, for instance, R134A, R1233zd, R1234ze, or NOVEC™ 7000 available from 3M Corporation of St. Paul, Minn. (USA). In one or more implementations, the one or more electronic components to be cooled may be immersed within the liquid dielectric fluid in a liquid region 601 of the compartment. The electronic component(s) dissipates heat by boiling the liquid dielectric fluid, which then rises as dielectric fluid vapor to a vapor region 602 and condenses on one or more inner condensing surfaces 221 within vapor region 602 of the electronic package. The two-phase dielectric fluid has an established saturation pressure and temperature relationship, referred to herein as an established saturation line or curve within the secure volume for specified, normal operating conditions of the electronic package. This established saturation line may be predefined and stored for access by a tamper-respondent detector 605, also disposed within secure volume 201. Any deviation from the expected pressure temperature relationship results in the tamper-respondent detector detecting occurrence of an intrusion event. Note, in this regard, that with occurrence of an intrusion event into the secure volume, the temperature and/or pressure of the two-phase dielectric fluid within the secure volume will change, resulting in a change in the detected pressure temperature relationship, with the changed relationship deviating from the established saturation line.

Figure 6B:
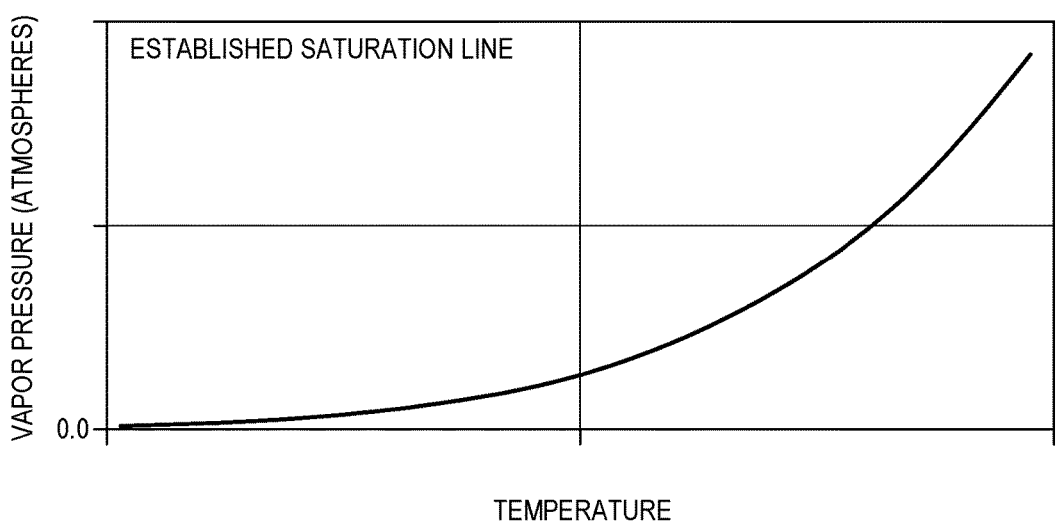
FIG. 6B is an exemplary depiction of an established saturation line or curve illustrating a defined relationship between pressure and temperature of the two-phase dielectric fluid within the secure volume of a tamper-proof electronic package, in accordance with one or more aspects of the present invention.

FIG. 6B depicts one example of an established saturation line for a two-phase dielectric fluid within a secure volume of an electronic package such as described herein. In operation, the two-phase dielectric fluid boils at the heat generating elements and condenses, for instance, on the relatively cooler surfaces exposed within the vapor region 602 (FIG. 6A) of the secure volume. Heat is then conducted through, for example, tamper-respondent sensor 221 (FIG. 6A) and enclosure 220 (FIG. 6A) for exhausting to the airflow passing across the exterior of the enclosure, whether via natural or forced convection. Should the secure volume be breached, then the two-phase dielectric fluid (or coolant) leaks from the secure volume and air enters, changing the properties of the mixture within the secure volume, which causes the measured pressure temperature relationship to deviate from the pre-established saturation line (such as depicted in FIG. 6B). This deviation is detected by the detector as representative of the intrusion event.

Figure 6C:
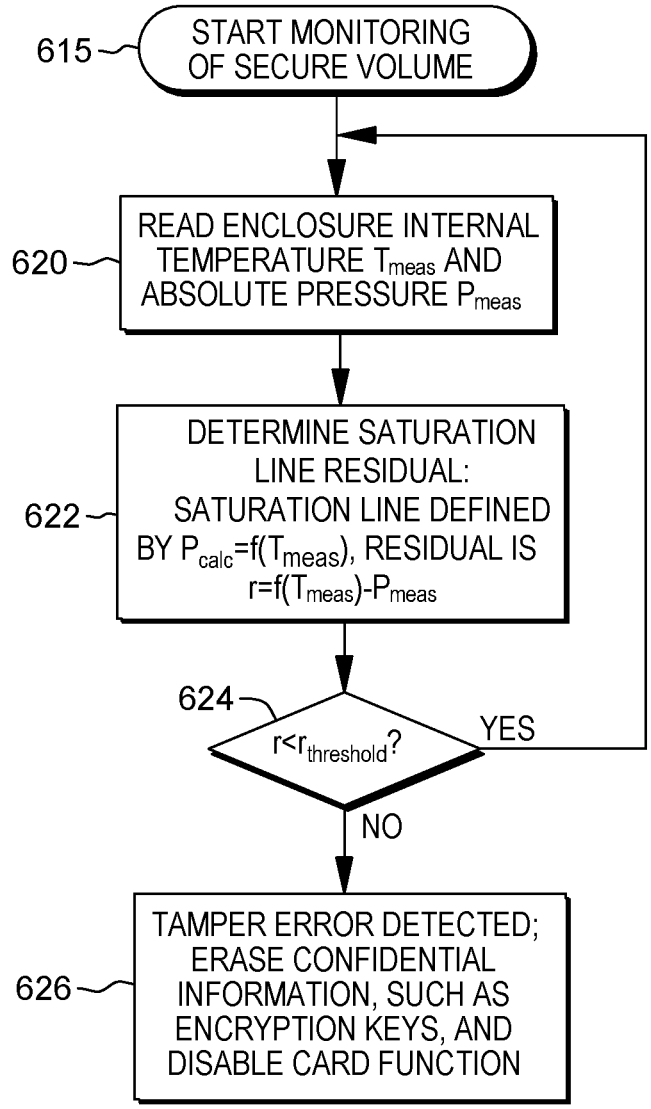
FIG. 6C depicts one embodiment of a detection process implemented by a tamper-respondent detector, in accordance with one or more aspects of the present invention.
Figure 6D:
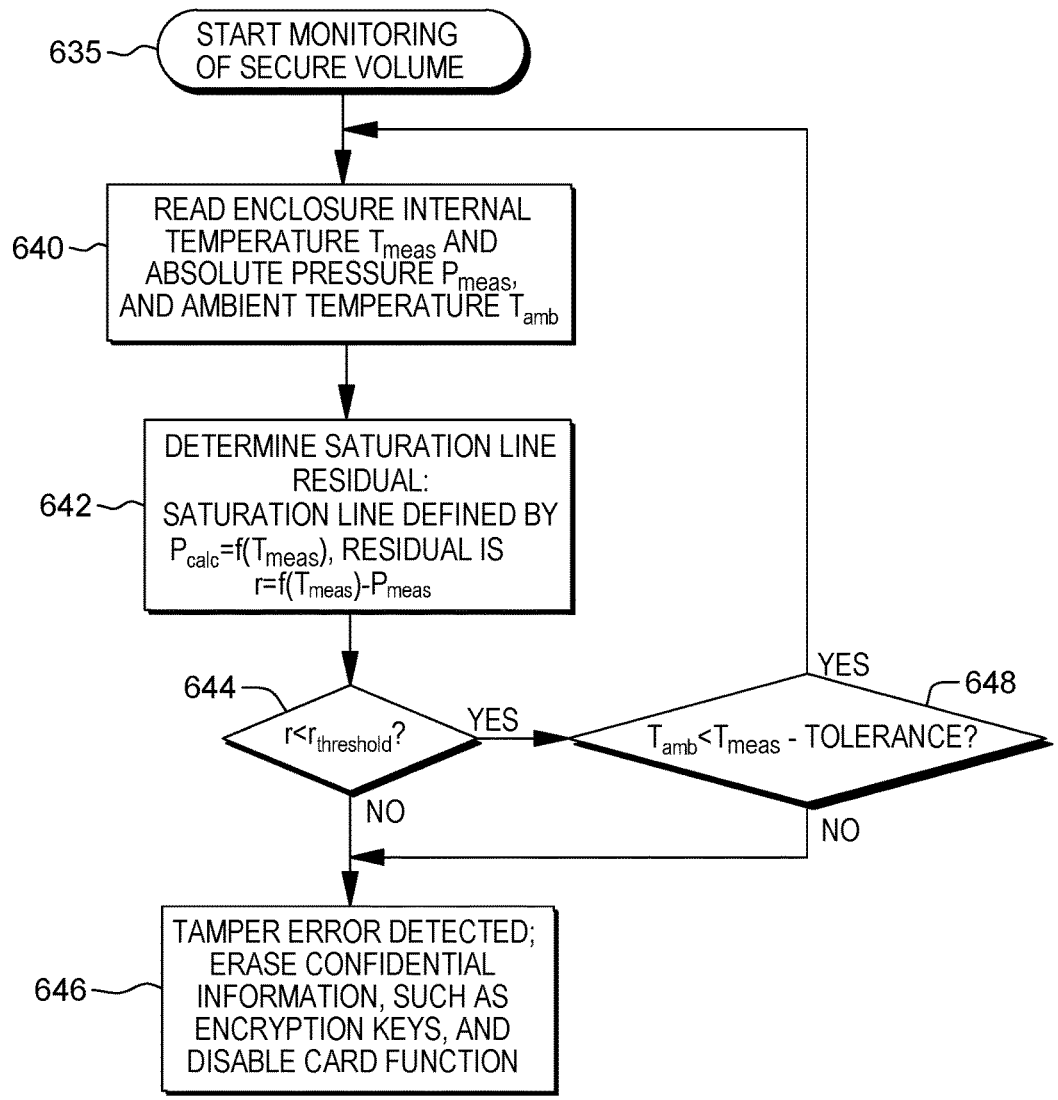
FIG. 6D depicts another embodiment of a detection process implemented by a tamper-respondent detector, in accordance with one or more aspects of the present invention.

FIGS. 6C & 6D depict detection processing which may be implemented by the tamper-respondent detector, such as tamper-respondent detector 605 in the tamper-proof electronic package 200' of FIG. 6A. Referring to FIG. 6C, upon starting monitoring of the secure volume 615, the detector reads the enclosure internal temperature $T_{meas}$ and absolute pressure $P_{meas}$ 620. This internal enclosure temperature $T_{meas}$ and pressure $P_{meas}$ may be obtained via temperature and pressure sensors 603, 604 (FIG. 6A), which in one embodiment, may be disposed within liquid region 601 of the two-phase dielectric fluid material. The tamper-respondent detector then determines a saturation line residual 622. The saturation line may be defined by $P_{calc}=f(T_{meas})$, with the residual being $r=f(T_{meas})-P_{meas}$, where f( ) is a functional representation of the dielectric fluid pressure-temperature relationship at the saturation line. Using this information, the detector determines whether the determined saturation line residual r is less than a pre-specified saturation line residual threshold $r_{threshold}$ 624. If "no", then a tamper error is detected 626, and the detector may initiate erasing confidential information, such as encryption/decryption keys, and/or disable card functionality. Otherwise, the detector returns to read the next internal temperature $T_{meas}$ and absolute pressure $P_{meas}$ within the secure volume 620.

FIG. 6D depicts an alternate embodiment of a detection process which may be implemented by a tamper-respondent detector, such as tamper-respondent detector 605 of tamper-proof electronic package 200' of FIG. 6A. Upon starting monitoring of the secure volume 635, the detector reads the internal temperature $T_{meas}$ and absolute pressure $P_{meas}$ of the fluid within the secure volume, as well as an ambient temperature $T_{amb}$ 640 external to the enclosure. As illustrated in FIG. 6A, in one or more implementations, an ambient temperature sensor 610 may be provided to measure temperature external to the enclosure. Using the obtained measurements, the detector determines the saturation line residual 642, with the saturation line being defined by $P_{calc}=f(T_{meas})$, and the residual being $r=f(T_{meas})-P_{meas}$. The detector determines whether the determined saturation line residual r is less than a predefined saturation line residual threshold $r_{threshold}$ 644. If "no", then a tamper error is detected, and the detector may initiate erasing confidential information, such as encryption/decryption keys, and/or disable card functionality 646. If the saturation line residual r is at or above the threshold $r_{threshold}$, then the detector determines whether the ambient temperature $T_{amb}$ is less than the measured temperature $T_{meas}$ within the secure volume offset by a set tolerance value or percentage 648. Assuming that the ambient temperature $T_{amb}$ is less, then processing returns to read the next temperature $T_{meas}$ and absolute pressure $P_{meas}$ values within the secure volume. Otherwise, a tamper error is detected 646. In this implementation, if the temperature sensor $T_{meas}$ within the secure volume reads substantially below (for instance, more than 2× the tolerance of the sensor), the ambient temperature $T_{amb}$, then the detector can conclude that dielectric fluid is leaking out of the enclosure. This is because the interior of the enclosure (that is, the secure volume), will cool as the dielectric fluid expands. Specifically, as vapor pressure decreases within the secure volume, the temperature of the remaining fluid will decrease as well.

By way of further explanation, various approaches may be used to fill tamper-proof electronic package 200' of FIG. 6A with two-phase dielectric fluid 600. For instance, the enclosure 220, or multilayer circuit board 210, may include a temporary port into secure volume 201, which allows a vacuum pump to be attached to draw air out of the secure volume. Once a suitable vacuum pressure is obtained (for instance, 500 μms Hg absolute pressure), then the secure volume may be back-filled with the desired mass of two-phase dielectric fluid 600, after which the temporary port is sealed, for instance, plugged, soldered, braised, etc. Alternatively, two-phase dielectric fluid 600 may be obtained by: providing a temporary port into the secure volume (for instance, through enclosure 220 or multilayer circuit board 210); filling the secure volume with liquid dielectric fluid 600; and then heating the liquid dielectric fluid to cause boiling of the fluid, with the dielectric fluid vapor being expelled through, for instance, the fill port, until the desired two-phase dielectric fluid charge remains, after which the temporary port is sealed. Note that similar approaches may be employed to fill the secure volume in any of the tamper-proof electronic packages described herein as well.

FIG. 7 depicts an alternate embodiment of a tamper-proof electronic package 700, which comprises one or more electronic components, such as a circuit 715 and/or electronic devices (or elements) 703 to be protected, in accordance with one or more aspects of the present invention. In the depicted embodiment, circuit 715 may reside on or comprise a card, such as cryptographic communications card, with the card being disposed within a secure volume defined by an enclosure 720, such as a thermally conductive enclosure which operates as a heat sink to facilitate cooling of the one or more electronic components within the secure volume of the enclosure. The secure volume is further defined by one or more security meshes or tamper-respondent sensors 721 which are associated with enclosure 720, for example, wrapping around the inner surface of enclosure 720, to facilitate defining the secure volume containing the one or more electronic components to be protected. Tamper-respondent sensor 721 may be similar in construction to tamper-respondent sensor 221 described above in connection with the embodiments of FIGS. 2A-6A.

As illustrated, tamper-proof electronic package 700 further includes a two-phase dielectric fluid 600, which may be a variety of volatile dielectric fluids or refrigerants, such as, for instance, the NOVEC™ 7000 fluid noted above. In one or more implementations, the one or more electronic components to be cooled are immersed within liquid dielectric fluid in liquid region 601. The electronic component(s) dissipates heat by boiling the dielectric fluid liquid, which then rises as dielectric fluid vapor to vapor region 602 and condenses on one or more inner condensing surfaces of the electronic package. In the embodiment depicted, the one or more condensing surfaces would comprise one or more exposed surfaces of the tamper-respondent sensor 721 in vapor region 602.

As explained above, the two-phase dielectric fluid 600 has an established saturation pressure and temperature relationship within the secure volume, referred to herein as an established saturation line for specified, normal operating conditions of the electronic package. The established saturation line may be predefined and stored for access by tamper-respondent detector 605, also disposed within the secure volume. Any deviation in the expected pressure temperature relationship will result in tamper-respondent detector 605 detecting occurrence of an intrusion event. As explained above, with occurrence of an intrusion event into the secure volume, the temperature and/or pressure of the two-phase dielectric fluid 600 within the secure volume will change, resulting in a change in the detected pressure temperature relationship, with the detected relationship therefore deviating from the established saturation line.

As noted, by providing the two-phase dielectric fluid within the secure volume, heat transfer is facilitated by pool boiling of liquid dielectric fluid and condensing of the dielectric fluid vapor on one or more cooler condensing surfaces exposed within the secure volume, with the heat being conducted through the one or more tamper-respondent sensors 721 and material of enclosure 720, for, for instance, dissipation to a cooling air flow passing across the tamper-proof electronic package 700. Further, the tamper-respondent detector determining the current pressure temperature relationship and comparing it to an established saturation line (or established pressure temperature relationship), advantageously provides another avenue for detecting a tamper intrusion event into the secure volume, that is, in combination with monitoring the one or more tamper-detect networks provided by the one or more tamper-respondent sensors 721. Thus, should a tamper intrusion event circumvent the one or more tamper-respondent sensors, any penetration into the secure volume will necessarily result in a change in the expected pressure temperature relationship, which once detected will be identified by the tamper-respondent detector. That is, the tamper-respondent detector monitors temperature and pressure and determines if the conditions stray from the known behavior of the two-phase dielectric fluid within the secure volume.

Note that, also, although depicted horizontally in FIG. 7, the tamper-proof electronic package 700 could alternatively be oriented vertically in operation, or any other orientation. In the embodiment depicted, the tamper-proof electronic package 700 may be mounted to a multilayer circuit board 710, which in this embodiment may reside outside of the electronic package.

Figure 8:
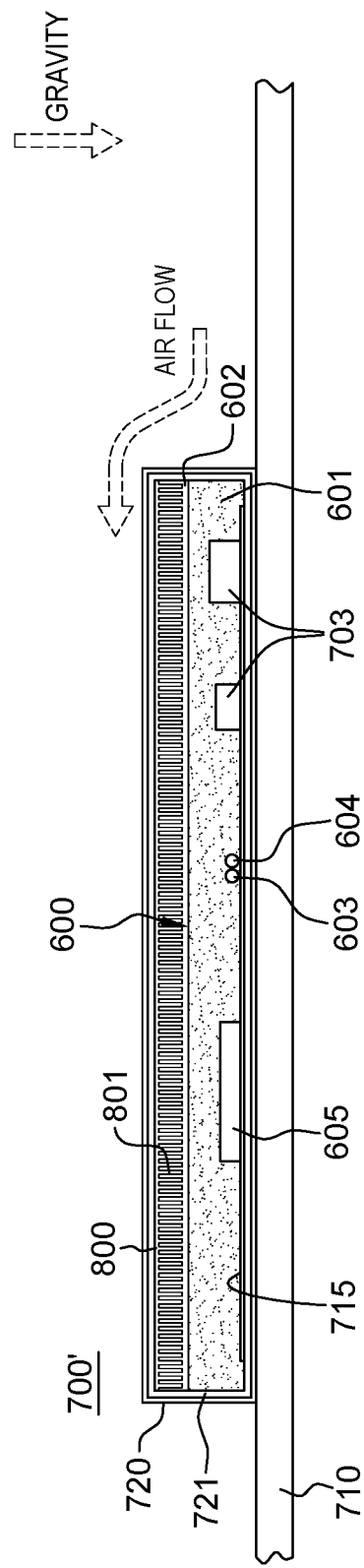
FIG. 8 is a cross-sectional elevational view of a further embodiment of a tamper-proof electronic package, which includes a two-phase dielectric fluid within a secure volume defined by an enclosure and at least one tamper-respondent sensor along an inner surface thereof, in accordance with one or more aspects of the present invention.

FIG. 8 depicts another tamper-proof electronic package 700' which is similar to tamper-proof electronic package 700 of FIG. 7. The difference is the addition of a thermally conductive condenser 800 into the secure volume defined within the enclosure, for instance, within vapor region 602. In the embodiment depicted, thermally conductive condenser 800 includes a plurality of thermally conductive fins 801 depending downward in the horizontal operational configuration of FIG. 8. Note in this regard that if intended to be oriented vertically when operational, then the thermally conductive condenser 800 could be configured differently and employed along a different inner surface of the enclosure. In the embodiment depicted, thermally conductive condenser 800 may be adhesively affixed to tamper-respondent sensor 721, for instance, where overlying an inner main surface of enclosure 720. In particular, thermally conductive condenser 800 could be adhered by an adhesive, for example, to thermally and mechanically couple to the tamper-respondent sensor, which is itself in thermal and mechanical contact with the enclosure, thus allowing for conduction of heat from thermally conductive condenser 800 outward to the exterior surface of enclosure 720.

Figure 9C:
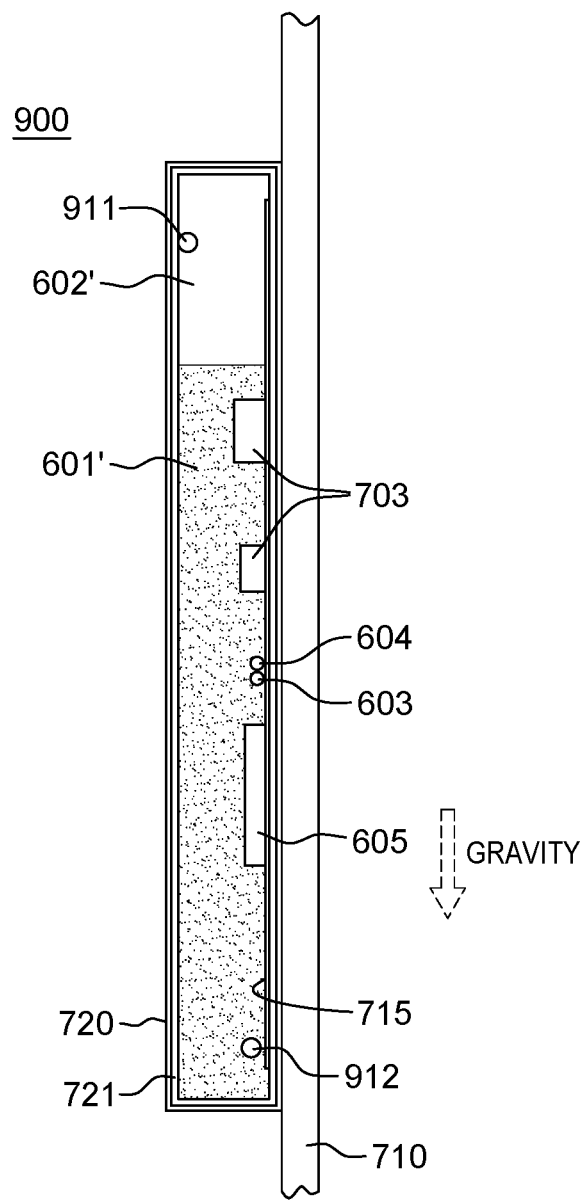
FIG. 9C is a cross-sectional elevational view of the tamper-proof electronic package of FIG. 9A, taken along line 9C-9C thereof, and illustrating, by way of example, a vertical operational orientation of the tamper-proof electronic package, in accordance with one or more aspects of the present invention.

By way of example, FIGS. 9A-9C depict a further variation of the tamper-proof electronic package 700 of FIG. 7. Referring to FIGS. 9A-9C, a tamper-proof electronic package, generally denoted 900, is illustrated which includes enclosure 720 mounted to multilayer circuit board 710. Tamper-proof electronic package 900 of FIGS. 9A-9C is substantially identical to that described above in connection with FIG. 7, with the exception that an external condenser 910 is added mounted, by way of example, to multilayer circuit board 710. External condenser 910 is in fluid communication with the secure volume containing the two-phase dielectric fluid 600 via a vapor fluid tube 911 and a liquid fluid tube 912. External condenser 910 may take a variety of configurations. For instance, external condenser 910 could comprise an air-cooled structure, or a liquid-cooled structure, with an air-cooled structure being depicted in FIGS. 9A-9C by way of example. External condenser 910 provides one or more condensing surfaces within, for instance, an inner chamber thereof that facilitate condensing of dielectric fluid vapor back to liquid dielectric fluid for return to the secure volume within enclosure 720. Note that should a tamper intrusion event attempt access to the secure volume through vapor fluid tube 911 or liquid vapor tube 912, then the resultant opening would necessarily produce a change from the expected pressure temperature relationship of the two-phase dielectric fluid within the secure volume, allowing the tamper-respondent detector 605 to detect the intrusion event, as explained above.

By way of example, the tamper-respondent detector can operate in various orientations, with a horizontal orientation shown in the cross-sectional elevational view of FIG. 9B, and a vertical orientation shown in the cross-sectional elevational view of FIG. 9C. This is facilitated by placement of the vapor and liquid fluid tubes 911, 912 as illustrated in FIGS. 9A-9C. Liquid fluid tube 912 is placed close to the circuit 715, such as a communications card, and in a lower position with respect to gravity in both the horizontal and vertical orientations, while vapor fluid tube 911 is placed away from circuit 715, and in an upper position with respect to gravity in both the horizontal and vertical orientations. Note with respect to the orientation of FIG. 9C, that the liquid region 601' and vapor region 602' occupy different regions of the secure volume within the tamper-proof electronic package. Also, note that the two-phase dielectric fluid may be selected and provided in sufficient amount to ensure that the one or more electronic components to be cooled remain in the liquid region 601' during normal operating conditions, whether operating in the horizontal or vertical orientation.

Figure 10A:
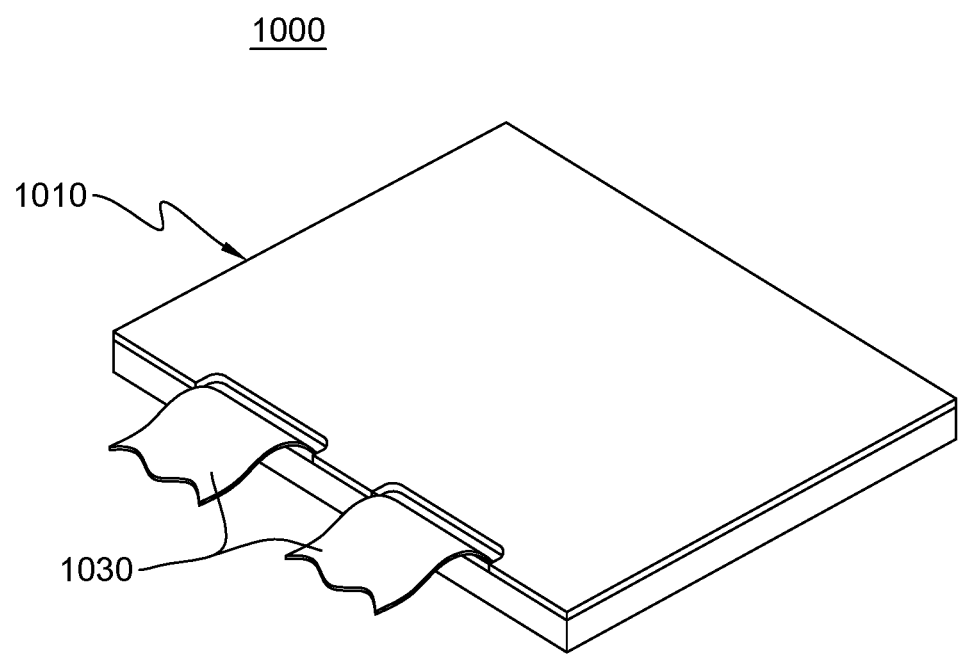
FIG. 10A depicts a further embodiment of a tamper-proof electronic package, in accordance with one or more aspects of the present invention.
Figure 10B:
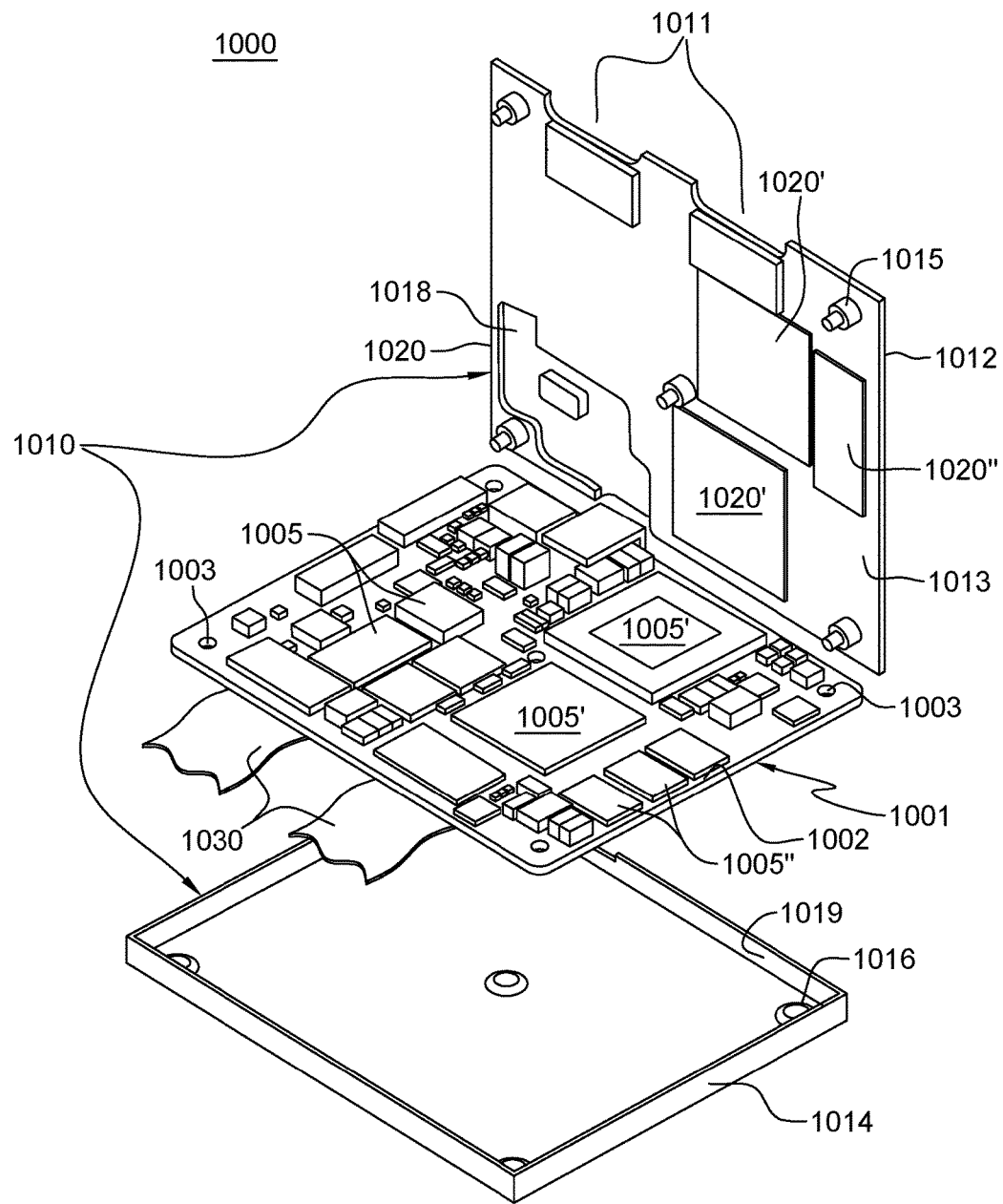
FIG. 10B depicts the tamper-proof electronic package of FIG. 10A, with a thermally conductive cover and base of the enclosure shown exploded from electronic components housed within the enclosure, and with the two-phase dielectric fluid not shown, in accordance with one or more aspects of the present invention.

Referring collectively to FIGS. 10A & 10B, another embodiment of a tamper-proof electronic package 1000 with enhanced thermal dissipation is illustrated, by way of example. Electronic package 1000 includes, in one or more embodiments, an enclosure 1010 comprising an electronic system 1001, such as an electronic assembly of a tamper-proof electronic package.

In the embodiment illustrated, electronic system 1001 includes a substrate 1002, such as a printed circuit board, and a plurality of heat-dissipating components, such as a plurality of electronic components 1005, 1005', 1005", with one or more electronic components 1005', 1005" of the plurality of electronic components being higher heat-flux-producing components, such as, for instance, processor modules 1005' and supporting memory modules 1005".

In the depicted embodiment, enclosure 1010 includes a thermally conductive cover 1012 overlying electronic system 1001, and a base 1014, such as a thermally conductive base, disposed beneath electronic system 1001. A plurality of spacers or standoffs 1015 are provided extending, for instance, through respective openings 1003 in substrate 1002 and engaging respective recesses 1016 in base 1014. The plurality of spacers 1015 define a spacing between thermally conductive cover 1012 and base 1014, and also set the height of the inner main surface 1013 of thermally conductive cover 1012 over, for instance, respective upper surfaces of the electronic components 1005, 1005', 1005", of electronic system 1001. This height is set sufficient to accommodate all the differently sized components within the electronic system without the cover physically contacting any of the components to guard against applying undue pressure to the components, potentially damaging the highest component or electrical interconnects to, for instance, substrate 1002.

In the embodiment depicted, thermally conductive cover 1012 includes recessed edge regions 1011 along an edge thereof. Note that recessed edge regions 1011 are for one embodiment only of enclosure 1010, being provided, for instance, for a tamper-proof electronic package, where enclosure 1010 is to be surrounded by, in part, one or more layers such that an airtight or sealed compartment is defined within electronic package 1000, and more particularly, within enclosure 1010. By way of example, recessed edge regions 1011 may be provided to accommodate flexible ribbon cables 1030, which may, for instance, electrically interconnect a tamper-respondent sensor (not shown) surrounding enclosure 1010 to monitor circuitry within electronic system 1001. In addition, note that in one or more embodiments, thermally conductive cover 1012 may include one or more recessed regions 1018 in inner main surface 1013 thereof, configured and sized to accommodate, for instance, one or more cables (not shown) electrically connecting to one or more components of electronic system 1001.

In one or more implementations, thermally conductive cover 1012 of enclosure 1010 may be formed of copper, brass, or aluminum, or alternatively, gold, diamond, graphite, graphene, beryllium oxide, etc., assuming that the desired high thermal conductivity is provided by the material. In one or more other embodiments, a metal alloy may be employed, or multiple layers of thermally conductive material could be used to define thermally conductive cover 1012. Base 1014 may comprise, in one or more implementations, a thermally conductive material as well, such as the above-noted materials of thermally conductive cover 1012. In addition, base 1014 may include sidewalls 1019 facilitating defining enclosure 1010 about electronic system 1001, and more particularly, about the substrate and the plurality of electronic components thereof.

As illustrated, one or more heat transfer elements 1020 may be provided extending from main surface 1013 of thermally conductive cover 1012. For instance, heat transfer elements 1020 may be coupled to, or integrated with, thermally conductive cover 1012 to provide heat conduction pathways from one or more electronic components 1005', 1005", to thermally conductive cover 1012 of enclosure 1010, to facilitate heat dissipation from the one or more electronic components, which in one example, may be higher heat-flux-dissipating components within the enclosure. By way of example, relatively large heat transfer elements 1020' may be provided, configured to and aligned over the higher heat-dissipating, electronic components 1005', with each heat transfer element 1020' being sized in one or more dimensions (for instance, in x-y dimensions) to correspond to the upper surface area and configuration of the respective electronic component 1005', over which the heat transfer element is disposed, and to which the heat transfer element 1020' couples via, for instance, a thermal interface material (TIM), such as a thermal interface pad or material offered by Parker Chomerics of Woburn, Mass., USA, a liquid dispense, thermally conductive material or gap pad, offered by the Bergquist Company, of Chanhassen, Minn., USA, or a phase change material, etc.

By way of further enhancement, tamper-proof electronic package 1000 of FIGS. 10A & 10B may include, in one or more embodiments, a two-phase dielectric fluid (not shown), such as the two-phase dielectric fluid 600 (see FIG. 6A) described above. In or more embodiments, the one or more electronic components within tamper-proof electronic package 1000 may be immersed or surrounded by liquid dielectric fluid in a liquid region of the secure volume, and the electronic components also dissipate heat by boiling the dielectric fluid liquid, which then rises as dielectric fluid vapor to a vapor region and condenses on one or more inner condensing surfaces of the electronic package. In the embodiment depicted, the one or more condensing surfaces could comprise any exposed portions of inner main surface 1013 of thermally conductive cover 1012. A tamper-respondent detector or monitor is provided within tamper-proof electronic package 1000 to monitor temperature and pressure of the two-phase dielectric fluid within the package such as described herein. In operation, should the secure volume be breached, then the two-phase dielectric fluid will leak from the secure volume and air enter, changing the properties of the mixture within the secure volume, thereby causing the measured pressure and temperature relationship to deviate from the pre-established saturation line. This deviation is detected by the detector as representative of the intrusion event, allowing action to be taken to protect, for instance, erase, any confidential information and/or to disable the communications card within the tamper-proof electronic package 1000.

Figure 11:
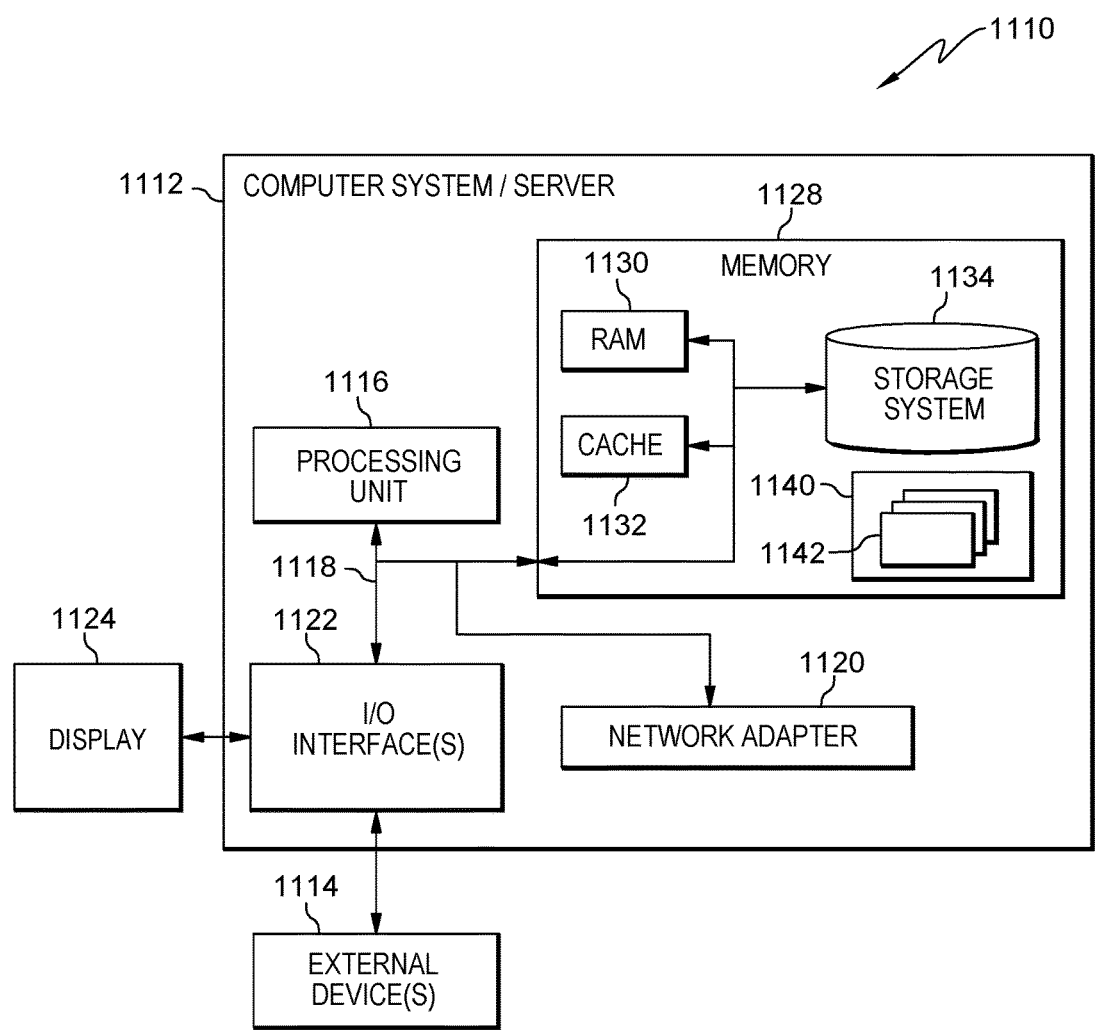
FIG. 11 depicts one embodiment of a data processing system which may implement one or more detecting and control aspects of the present invention.

Referring now to FIG. 11, a schematic of an example of a data processing system 1110 is shown, which may be used to implement the detector. Data processing system 1110 is only one example of a suitable data processing system and is not intended to suggest any limitation as to the scope of use or functionality of embodiments of the invention described herein. Regardless, data processing system 1110 is capable of being implemented and/or performing any of the functionality set forth herein above, such as the tamper-respondent detector functionality discussed.

In data processing system 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in data processing system 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

Bus 1118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), Micro Channel Architecture (MCA), Enhanced ISA (EISA), Video Electronics Standards Association (VESA), and Peripheral Component Interconnect (PCI).

Computer system/server 1112 typically includes a variety of computer system readable media. Such media may be any available media that is accessible by computer system/server 1112, and it includes both volatile and non-volatile media, removable and non-removable media.

System memory 1128 can include computer system readable media in the form of volatile memory, such as random access memory (RAM) 1130 and/or cache memory 1132. Computer system/server 1112 may further include other removable/non-removable, volatile/non-volatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1118 by one or more data media interfaces. As will be further depicted and described below, memory 1128 may include at least one program product having a set (e.g., at least one) of program modules that are configured to carry out the functions of embodiments of the invention.

Program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc.; one or more devices that enable a user to interact with computer system/server 1112; and/or any devices (e.g., network card, modem, etc.) that enable computer system/server 1112 to communicate with one or more other computing devices. Such communication can occur via Input/Output (I/O) interfaces 1122. Still yet, computer system/server 1112 can communicate with one or more networks such as a local area network (LAN), a general wide area network (WAN), and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples, include, but are not limited to: microcode, device drivers, redundant processing units, external disk drive arrays, RAID systems, tape drives, and data archival storage systems, etc.

The control aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Certain aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A tamper-proof electronic package comprising:
    an enclosure to enclose, at least in part, at least one electronic component within a secure volume;
    a two-phase dielectric fluid within the secure volume, the two-phase dielectric fluid comprising liquid dielectric fluid and vapor dielectric fluid within the secure volume, and the two-phase dielectric fluid being at an established saturation line of the two-phase dielectric fluid within the secure volume; and
    a tamper-respondent detector to monitor, at least in part, temperature and pressure of the two-phase dielectric fluid and determine therefrom a current pressure temperature relationship, wherein in operation, the current pressure temperature relationship of the two-phase dielectric fluid deviates from the established saturation line of the two-phase dielectric fluid within the secure volume with an intrusion event into the secure volume, and the tamper-respondent detector detects, from the monitoring of the temperature and pressure of the two-phase dielectric fluid and the determining of the current pressure temperature relationship, deviation from the established saturation line, and thereby the intrusion event.

2. The tamper-proof electronic package of claim 1, wherein the at least one electronic component is immersed within the liquid dielectric fluid within the secure volume and, in operation, the two-phase dielectric fluid boils at the at least one electronic component and condenses at an inner condensing surface of the tamper-proof electronic package within a vapor region of the secure volume.

3. The tamper-proof electronic package of claim 2, further comprising at least one tamper-respondent sensor coupled to an inner surface of the enclosure, the at least one tamper-respondent sensor comprising circuit lines defining one or more tamper-detect networks, and wherein the inner condensing surface comprises a surface of the at least one tamper-respondent sensor, and the tamper-respondent detector further monitors the one or more tamper-respondent networks for the intrusion event.

4. The tamper-proof electronic package of claim 3, further comprising:
    a multilayer circuit board, the enclosure being coupled to the multilayer circuit board, and together, the enclosure and the multilayer circuit board enclosing the at least one electronic component; and
    a tamper-respondent sensor embedded within the multilayer circuit board, the embedded tamper-respondent sensor defining, at least in part, the secure volume, and the embedded tamper-respondent sensor comprising one or more additional tamper-detect networks embedded within the multilayer circuit board.

5. The tamper-proof electronic package of claim 2, further comprising a thermally conductive condenser with a plurality of thermally conductive fins disposed within the vapor region of the secure volume, the inner condensing surface being a surface of the thermally conductive condenser.

6. The tamper-proof electronic package of claim 5, further comprising at least one tamper-respondent sensor coupled to an inner surface of the enclosure, the at least one tamper-respondent sensor comprising circuit lines defining one or more tamper detect networks, and wherein the at least one tamper-respondent sensor covers an inner main surface of the enclosure, and the thermally conductive condenser overlies, at least in part, the at least one tamper-respondent sensor, the at least one tamper-respondent sensor being disposed, at least in part, between the enclosure and the thermally conductive condenser.

7. The tamper-proof electronic package of claim 1, further comprising an external condenser, the external condenser being coupled in fluid communication with the secure volume via a vapor fluid tube and a liquid fluid tube, wherein dielectric fluid vapor passes from the secure volume to the external condenser through the vapor fluid tube, condenses within the external condenser, and is returned to the secure volume via the liquid fluid tube as liquid dielectric fluid.

8. The tamper-proof electronic package of claim 1, wherein the detecting by the tamper-respondent detector comprises:
    determining a saturation line residual using the monitored temperature and pressure of the two-phase dielectric fluid within the secure volume;
    determining whether the saturation line residual exceeds a predefined saturation line residual threshold; and
    the tamper-respondent detector detecting occurrence of the intrusion event when the determined saturation line residual exceeds the predefined saturation line residual threshold.

9. The tamper-proof electronic package of claim 8, wherein the tamper-respondent detector further monitors ambient temperature external to the enclosure, and detects occurrence of the intrusion event when the monitored ambient temperature equals or exceeds the monitored temperature of the two-phase dielectric fluid within the secure volume adjusted by a predefined tolerance value or percentage.

10. A tamper-proof electronic package comprising:
    at least one electronic component;
    an enclosure enclosing, at least in part, the at least one electronic component within a secure volume;
    a two-phase dielectric fluid within the secure volume, the two-phase dielectric fluid comprising liquid dielectric fluid and vapor dielectric fluid within the secure volume, and the two-phase dielectric fluid being at an established saturation line of the two-phase dielectric fluid within the secure volume; and
    a tamper-respondent detector to monitor, at least in part, temperature and pressure of the two-phase dielectric fluid and determine therefrom a current pressure temperature relationship, wherein in operation, the current pressure temperature relationship of the two-phase dielectric fluid deviates from the established saturation line of the two-phase dielectric fluid within the secure volume with an intrusion event into the secure volume, and the tamper-respondent detector detects, from the monitoring of the temperature and pressure of the two-phase dielectric fluid and the determining of the current pressure temperature relationship, deviation from the established saturation line, and thereby the intrusion event.

11. The tamper-proof electronic package of claim 10, wherein the at least one electronic component is immersed within the liquid dielectric fluid within the secure volume and, in operation, the two-phase dielectric fluid boils at the at least one electronic component and condenses at an inner condensing surface of the tamper-proof electronic package within a vapor region of the secure volume.

12. The tamper-proof electronic package of claim 11, further comprising at least one tamper-respondent sensor coupled to an inner surface of the enclosure, the at least one tamper-respondent sensor comprising circuit lines defining one or more tamper-detect networks, and wherein the inner condensing surface comprises a surface of the at least one tamper-respondent sensor, and the tamper-respondent detector further monitors the one or more tamper-respondent networks for the intrusion event.

13. The tamper-proof electronic package of claim 12, further comprising:
a multilayer circuit board, the enclosure being coupled to the multilayer circuit board, and together, the enclosure and the multilayer circuit board enclosing the at least one electronic component; and
a tamper-respondent sensor embedded within the multilayer circuit board, the tamper-respondent sensor defining, at least in part, the secure volume, and the tamper-respondent sensor comprising one or more additional tamper-detect networks embedded within the multilayer circuit board.

14. The tamper-proof electronic package of claim 11, further comprising a thermally conductive condenser with a plurality of thermally conductive fins disposed within the vapor region of the secure volume, the inner condensing surface being a surface of the thermally conductive condenser.

15. The tamper-proof electronic package of claim 14, further comprising at least one tamper-respondent sensor coupled to an inner surface of the enclosure, the at least one tamper-respondent sensor comprising circuit lines defining one or more tamper detect networks, and wherein the at least one tamper-respondent sensor covers an inner main surface of the enclosure, and the thermally conductive condenser overlies, at least in part, the at least one tamper-respondent sensor, the at least one tamper-respondent sensor being disposed, at least in part, between the enclosure and the thermally conductive condenser.

16. The tamper-proof electronic package of claim 10, further comprising an external condenser, the external condenser being coupled in fluid communication with the secure volume via a vapor fluid tube and a liquid fluid tube, wherein dielectric fluid vapor passes from the secure volume to the external condenser through the vapor fluid tube, condenses within the external condenser, and is returned to the secure volume via the liquid fluid tube as liquid dielectric fluid.

17. The tamper-proof electronic package of claim 16, wherein the detecting by the tamper-respondent detector comprises:
determining a saturation line residual using the monitored temperature and pressure of the two-phase dielectric fluid within the secure volume;
determining whether the saturation line residual exceeds a predefined saturation line residual threshold; and
the tamper-respondent detector detecting occurrence of the intrusion event when the determined saturation line residual exceeds the predefined saturation line residual threshold.

18. The tamper-proof electronic package of claim 17, wherein the tamper-respondent detector further monitors ambient temperature external to the enclosure, and detects occurrence of the intrusion event when determines whether the monitored ambient temperature equals or exceeds the monitored temperature of the two-phase dielectric fluid within the secure volume adjusted by a predefined tolerance value or percentage.

19. A method of fabricating a tamper-proof electronic package, the method comprising:
providing an enclosure enclosing, at least in part, at least one electronic component within a secure volume;
providing a two-phase dielectric fluid within the secure volume, the two-phase dielectric fluid comprising liquid dielectric fluid and vapor dielectric fluid within the secure volume, and the two-phase dielectric fluid being at an established saturation line of the two-phase dielectric fluid within the secure volume; and
providing a tamper-respondent detector to monitor, at least in part, temperature and pressure of the two-phase dielectric fluid and determine therefrom a current pressure temperature relationship, wherein in operation, the current pressure temperature relationship of the two-phase dielectric fluid deviates from the established saturation line of the two-phase dielectric fluid within the secure volume with an intrusion event into the secure volume, and the tamper-respondent detector detects, from the monitoring of the temperature and pressure of the two-phase dielectric fluid and the determining of the current pressure temperature relationship, deviation from the established saturation line, and thereby the intrusion event.

20. The method of claim 19, wherein the detecting by the tamper-respondent detector comprises:
determining a saturation line residual using the monitored temperature and pressure of the two-phase dielectric fluid within the secure volume;
determining whether the saturation line residual exceeds a predefined saturation line residual threshold; and
the tamper-respondent detector detecting occurrence of the intrusion event when the determined saturation line residual exceeds the predefined saturation line residual threshold.

* * * * *